United States Patent
Sellinger et al.

(10) Patent No.: US 11,286,208 B2
(45) Date of Patent: Mar. 29, 2022

(54) SYSTEMS AND METHODS FOR THERMALLY PROCESSING CMC COMPONENTS

(71) Applicant: General Electric Company, Schenectady, NY (US)

(72) Inventors: Aaron Todd Sellinger, Cincinnati, OH (US); Theodore Robert Grossman, Cincinnati, OH (US); Timothy P. Coons, Cincinnati, OH (US); Ryan Marcus Young, West Chester, OH (US); Nicholas Frederick Wendeln, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 727 days.

(21) Appl. No.: 16/106,647

(22) Filed: Aug. 21, 2018

(65) Prior Publication Data

US 2020/0062658 A1    Feb. 27, 2020

(51) Int. Cl.
   *C04B 35/00* (2006.01)
   *C04B 35/626* (2006.01)
   (Continued)

(52) U.S. Cl.
   CPC ........ *C04B 35/6267* (2013.01); *C04B 35/117* (2013.01); *C04B 35/14* (2013.01);
   (Continued)

(58) Field of Classification Search
   CPC .............................. B29C 64/379; B29C 70/44
   See application file for complete search history.

(56) References Cited

U.S. PATENT DOCUMENTS

| 5,439,627 A | 8/1995 | De Jager |
| 5,908,587 A | 6/1999 | Gross et al. |

(Continued)

FOREIGN PATENT DOCUMENTS

| CN | 207019459 U | 2/2018 |
| JP | H05508885 A | 12/1993 |

(Continued)

OTHER PUBLICATIONS

European Search Report Corresponding to Application No. 19191277 dated Jan. 27, 2020.

(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

Systems and methods for thermally processing composite components are provided. In one exemplary aspect, a system includes a thermal system, a mover device, and a control system. The system also includes a plurality of vessels in which one or more components may be placed. The vessels are similarly shaped and configured. A vessel containing the one or more components therein may be mounted into a chamber defined by the thermal system during thermal processing. The thermal system and vessels include features that allow components to be thermally processed, e.g., compacted, burnt-out, and densified via a melt-infiltration process, a polymer impregnation and pyrolyzing process, or a chemical vapor infiltration process. utilizing the same thermal system and common vessel design. The control system may control the thermal system and mover device to automate thermal processing of the composite components.

14 Claims, 15 Drawing Sheets

(51) Int. Cl.
  *C04B 35/565* (2006.01)
  *C04B 37/00* (2006.01)
  *C04B 35/117* (2006.01)
  *C04B 35/14* (2006.01)
  *C04B 35/80* (2006.01)

(52) U.S. Cl.
  CPC ............ *C04B 35/565* (2013.01); *C04B 35/80* (2013.01); *C04B 37/00* (2013.01)

(56) References Cited

U.S. PATENT DOCUMENTS

| | | | |
|---|---|---|---|
| 7,153,465 B1 | 12/2006 | Schwab et al. | |
| 8,309,013 B2 | 11/2012 | Pasquero et al. | |
| 9,815,118 B1 | 11/2017 | Schmitt et al. | |
| 2004/0211538 A1 | 10/2004 | Lorenz et al. | |
| 2015/0290878 A1* | 10/2015 | Houben | B22F 3/24 419/1 |
| 2016/0115086 A1 | 4/2016 | Tuertscher et al. | |
| 2016/0167133 A1 | 6/2016 | Yurko | |
| 2016/0326064 A1 | 11/2016 | Shim et al. | |
| 2017/0297111 A1 | 10/2017 | Myerberg et al. | |

FOREIGN PATENT DOCUMENTS

| | | | |
|---|---|---|---|
| JP | 2011/236077 A | 11/2011 | |
| JP | 2011/246316 A | 12/2011 | |
| JP | 2016/522348 A | 7/2016 | |
| JP | 2017/171568 A | 9/2017 | |
| JP | 2019/501849 A | 1/2019 | |
| WO | WO92/00182 A1 | 1/1992 | |
| WO | WO-9200182 A1 * | 1/1992 | ............ B22F 1/0059 |
| WO | WO2014/192565 A1 | 12/2014 | |
| WO | WO2017/072187 A | 5/2017 | |

OTHER PUBLICATIONS

Machine Translated Japanese Search Report Corresponding to Application No. 2019143761 dated Aug. 6, 2020.

* cited by examiner

SYSTEMS AND METHODS FOR THERMALLY PROCESSING CMC COMPONENTS

FIELD

The present subject matter relates generally to processing composite components, such as ceramic matrix composite (CMC) components. More particularly, the present subject matter relates to systems and methods for thermally processing composite components.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, components inside the combustion and turbine sections are complex to manufacture due to their geometries. Moreover, the working environment for such components is extremely severe due to the high temperature and pressures. Accordingly, components within the flow path of the combustion gases have strict requirements for their geometrical profiles and temperature tolerance to maintain desired efficiency of the engine. As ceramic matrix composite (CMC) materials can better withstand such severe environments than traditional materials, there is particular interest in replacing components formed of traditional materials inside gas turbine engine with CMC materials.

Composite components typically undergo thermal processing during manufacture. For instance, composite components may undergo a compaction or debulking process, a burnout process, and a densification process, such as e.g., a melt-infiltration process, a polymer impregnation and pyrolysis process, or a chemical vapor infiltration process. Thermally processing composite components has presented certain challenges. For instance, typically each thermal process is performed by a separate thermal system, e.g., an autoclave or furnace. For example, the components may be processed in an autoclave during compaction, moved to a furnace for the burnout process, and then moved to another thermal system for melt-infiltration. Moving the components from thermal system to thermal system prevents contamination between the processes, but requires significant floor space and requires extensive cost and upkeep to maintain the thermal system. Moreover, transporting the components from system to system is time consuming and provides opportunities for the parts to become damaged. Moreover, the chambers or interior volumes within the thermal systems are typically large and can require time and significant energy to heat, pressurize, or create a vacuum within; thus, operating such thermal systems is expensive, and in many instances, inefficient.

Accordingly, improved systems and methods that address one or more of the challenges noted above would be useful.

BRIEF DESCRIPTION

Aspects and advantages of the invention will be set forth in part in the following description, or may be obvious from the description, or may be learned through practice of the invention.

In one exemplary aspect, the present disclosure is directed to a method for manufacturing a composite component. The method includes placing a first vessel having a preform disposed therein into a chamber defined by a thermal system. The method also includes compacting, by the thermal system, the preform within the first vessel at an elevated temperature and an elevated pressure to transition the preform to a green-state part. Further, the method includes removing the green-state part from the first vessel. The method also includes placing a second vessel having the green-state part disposed therein into the chamber of the thermal system. In addition, the method includes burning out, by the thermal system, the green-state part within the second vessel at an elevated temperature and under vacuum to transition the green-state part to a burnt-out part. Moreover, the method includes removing the burnt-out part from the second vessel. The method also includes placing a third vessel having the burnt-out part disposed therein into the chamber of the thermal system. The method further includes densifying, by the thermal system, the burnt-out part within the third vessel at an elevated temperature and under vacuum to transition the burnt-out part to the composite component.

In another exemplary aspect, the present disclosure is directed to a system for manufacturing a composite component. The system includes a thermal system defining a chamber. The system also includes a plurality of vessels each removably mountable within the chamber, wherein the composite component is removably insertable into a volume of any one of the plurality of vessels. The system also includes a mover device for inserting and removing the composite component into and from any one of the plurality of vessels and mounting and removing any one of the plurality of vessels to and from the chamber of the thermal system. The system also includes a control system comprising a controller communicatively coupled with the thermal system and the mover device. The controller is configured to control the mover device to mount a first vessel of the plurality of vessels having the composite component in a first state into the chamber of the thermal system; activate the thermal system to perform a first thermal process to transition the composite component from the first state to a second state; control the mover device to remove the first vessel having the composite component in the second state from the chamber of the thermal system; control the mover device to insert the composite component in the second state into a second vessel of the plurality of vessels; control the mover device to mount the second vessel having the composite component in the second state into the chamber of the thermal system; and activate the thermal system to perform a second thermal process to transition the composite component from the second state to a third state.

In another exemplary aspect, the present disclosure is directed to a method for manufacturing a component. The method includes placing a first vessel having the component disposed therein into a chamber defined by a thermal system, wherein during placing the first vessel, the component is in a first state. Further, the method includes performing, by the thermal system, a first thermal process to transition the component from the first state to a second state. Moreover, the method includes placing a second vessel having the component disposed therein into the chamber of the thermal system, wherein during placing the second vessel, the component is in the second state. In addition, the method includes performing, by the thermal system, a second thermal process to transition the component from the second state to a third state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
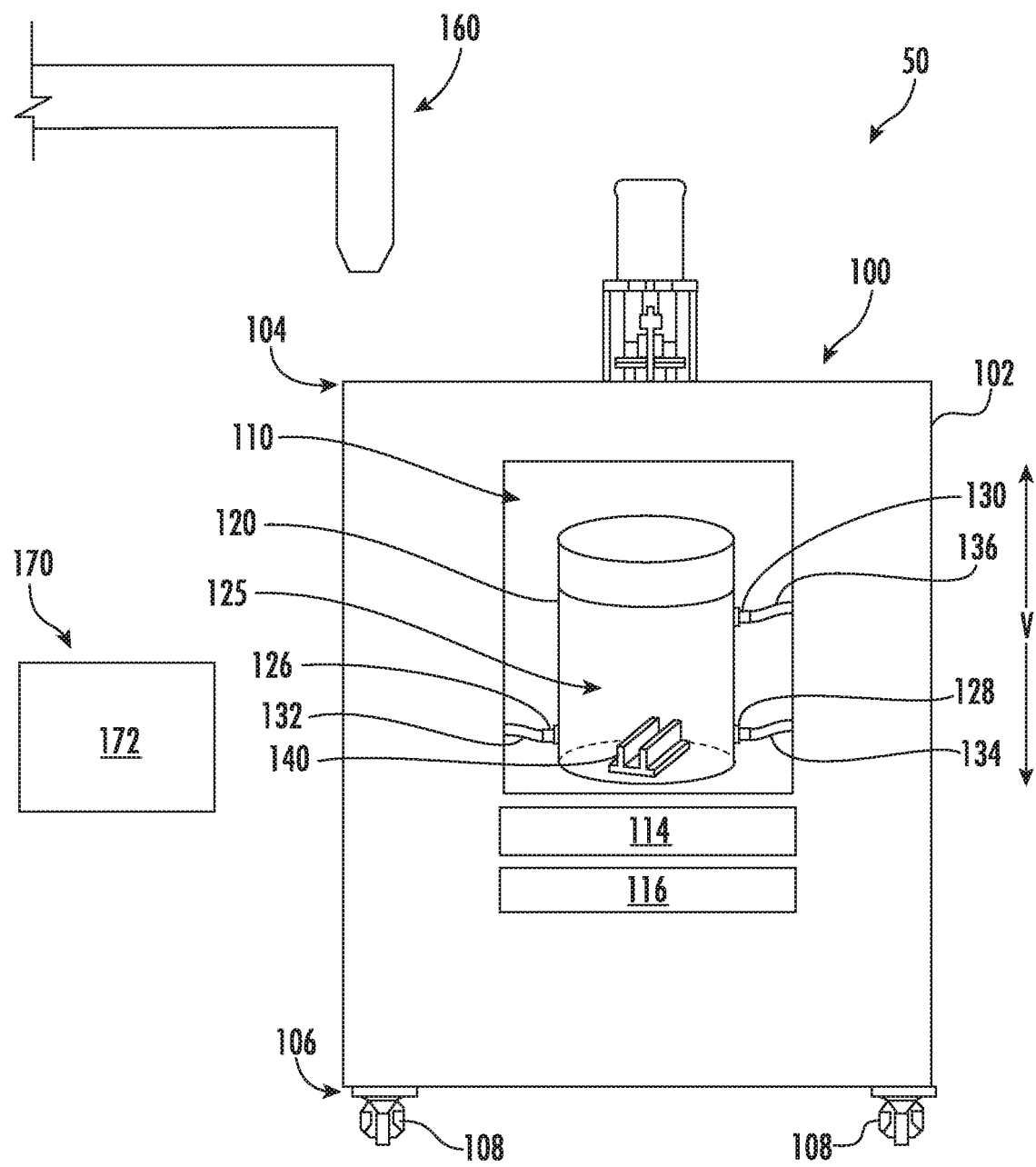
FIG. 1 provides a schematic view of an exemplary thermal system in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Exemplary aspects of the present disclosure are directed to systems and methods for thermally processing components, such as e.g., composite components. In one exemplary aspect, a system is provided. The system includes a thermal system, a mover device, and a control system for controlling the thermal system in the mover device. The system also includes a plurality of vessels in which one or more composite components may be thermally processed by the thermal system. The plurality of vessels are similarly shaped and configured. That is, the vessels have a common or standard shape and configuration. The control system may control the mover device to insert or remove one or more composite components into or from the vessels. The composite components may be positioned on shelves of a rack. The control system may also control the mover device to mount or remove a vessel to or from a chamber defined by the thermal system.

One or more composite components may be thermally processed by the system in the following exemplary manner. The one or more composite components may first be vacuum bagged and placed on shelves of a rack. The rack may then be inserted into a vessel of the plurality of vessels. The mover device may be controlled by the control system to insert the rack into the vessel. The mover device may also be controlled by the control system to mount the vessel with the one or more composite components disposed therein into the chamber of the thermal system. One or more connections or fittings may be connected to fluidly connect the interior volume of the vessel with various systems of the thermal system. Once properly situated within the chamber, the thermal system performs a first thermal process, such as e.g., a compaction process. The control system may activate the thermal system to perform the first thermal process. That is, the thermal system may heat and compact the one or more composite components via application of a positive pressure within the vessel. The compaction process transitions the preforms into green-state parts. After the first thermal process is completed, the vessel is removed from the chamber and the now green-state parts are unbagged.

The green-state parts are then placed into the same or different but similarly shaped vessel. The vessel with the green-state parts disposed therein is then placed back into the chamber of the thermal system. One or more connections or fittings may be connected once again to fluidly connect the interior volume of the vessel with various systems of the thermal system. This may be done automatically by the control system. Further, once properly situated within the chamber, the thermal system performs a second thermal process, such as e.g., a burnout process or a pyrolysis process. The control system may activate the thermal system to perform the second thermal process. That is, the thermal system may "burn out" and/or pyrolyze the polymer binder of the green-state parts at elevated temperatures and under vacuum. The burnout process transitions the green-state parts into burnt-out parts.

The burnt-out parts are then placed into the same or different but similarly shaped vessel that has been appropriately staged for infiltration or consolidation. For instance, one or more pucks of material may be placed adjacent the one or more composite components. The vessel is then placed back into the chamber of the thermal system and the one or more connections or fitting connections are made to fluidly connect the interior of the vessel with the systems of the thermal system. Once properly situated within the chamber, the thermal system performs a third thermal process, such as e.g., a melt-infiltration process, a polymer impregnation and pyrolysis process, or a chemical vapor infiltration process. The control system may activate the thermal system to perform the third thermal process. That is, the thermal system may melt-infiltrate and/or consolidate the burnt-out parts at elevated temperatures and under vacuum or inert environment. The melt-infiltration, polymer impregnation and pyrolysis, and or chemical vapor infiltration processes transitions the burnt-out parts into densified parts. Thereafter, the densified parts may be finish machined as necessary to form the final composite component. Methods for thermally processing such components utilizing the system noted above are also provided herein.

FIG. 1 provides a schematic view of an exemplary system 50 for manufacturing a composite component 140 in accordance with exemplary embodiments of the present disclosure. Generally, the system 50 includes a thermal system 100, a mover device 160, and a control system 170 that includes one or more controllers 172 communicatively coupled with the thermal system 100 and the mover device 160. The thermal system 100 is operatively configured to thermally process a composite component, such as a ceramic matrix composite (CMC) component for a gas turbine engine. In particular, as will be explained in greater detail herein, the thermal system 100 is operatively configured to thermally process a composite component in at least two of a compaction process, a burnout process, and a densification process, such as e.g., a melt infiltration process. In some embodiments, the thermal system 100 is operatively configured to thermally process a composite component in each of a compaction process, a burnout process, and a densification process, e.g., a melt infiltration process. In other embodiments, components formed of other materials may be thermally processed by the thermal system 100. For instance, a component formed of a metallic material, a single material, or other composite materials may be thermally processed by the thermal system 100. The mover device 160 of the system 50 is operatively configured to move various components of the system 50, e.g., into and out of the thermal system 100. The control system 170 is operatively configured to control the system 50, including the thermal system 100, the mover device 160, as well as other components of the system 50.

As shown in FIG. 1, the thermal system 100 of the system 50 includes a housing 102. The housing 102 extends between a top 104 and a bottom 106 along a vertical direction V defined by the thermal system 100. The thermal system 100 includes casters 108 at the bottom 106 of the housing 102. In this way, the thermal system 100 is movable, e.g., about a manufacturing facility. Moreover, the thermal system 100 defines a chamber 110, and more particularly, the housing 102 of the thermal system 100 defines the chamber 110. The chamber 110 is sized to receive a vessel 120 as shown in FIG. 1. The vessel 120 is removably mountable within the chamber 110. That is, the vessel 120 may be mounted into the chamber 110 as shown in FIG. 1 and may be removed therefrom, e.g., after completion of a thermal process. For instance, the mover device 160 may be configured to move the vessel 120 into and out of the chamber 110 of the thermal system 100. In some embodiments, however, the vessel 120 may be moved into and out of the chamber 110 manually. As further shown, the vessel 120 defines a volume 125. A composite component 140 is removably insertable into the volume 125 of the vessel 120. That is, the composite component 140 may be inserted into the volume 125 and may be removed therefrom, e.g., after completion of a thermal process. For instance, the mover device 160 may be configured to move the composite component 140 into and out of the volume 125 of the vessel 120. In some embodiments, however, the composite component 140 may be moved into and out of the vessel 120 manually.

As further shown in FIG. 1, the system 50 includes a control system 170 that includes one or more computing devices or controllers 172. As noted above, the control system 170 is operatively configured to control the various systems and devices of the system 50. Although only one controller 172 is shown in FIG. 1, the control system 170 can include a system of controllers or computing devices. Each of the controllers 172 of the control system 170 can include one or more processor(s) and one or more memory device(s). The one or more processor(s) can include any suitable processing device, such as a microprocessor, microcontroller, integrated circuit, logic device, and/or other suitable processing device. The one or more memory device(s) can include one or more computer-readable media, including, but not limited to, non-transitory computer-readable media, RAM, ROM, hard drives, flash drives, and/or other memory devices. The one or more memory device(s) can store information accessible by the one or more processor(s), including computer-readable instructions that can be executed by the one or more processor(s). The instructions can be any set of instructions that when executed by the one or more processor(s), cause the one or more processor(s) to perform operations, such as any of the operations and functions for which the controller 172 is configured, such as e.g., activating and controlling various aspects of the system 50. The instructions can be software written in any suitable programming language or can be implemented in hardware. Additionally, and/or alternatively, the instructions can be executed in logically and/or virtually separate threads on processor(s).

The memory device(s) can store data that can be accessed by the one or more processor(s). For example, the data can include temperature and pressure settings for thermally processing components disposed within the chamber 110 of the thermal system 100, settings for moving the mover device 160 configured to move the vessel 120 and/or components about a manufacturing facility, etc. The data can also include other data sets, parameters, outputs, information, etc. shown and/or described herein. The controller 172 can also include a communication interface for communicating, for example, with the other components of the system 50. The communication interface can include any suitable components for interfacing with one or more network(s) or electronic components, including for example, transmitters, receivers, ports, controllers, antennas, and/or other suitable components. Communication interface can be used to communicate with other electronic devices over one or more networks, such as e.g., a local area network (LAN), a wide area network (WAN), VHF network, a HF network, a Wi-Fi network, a WiMAX network, a gatelink network, and/or any other suitable communications networks. The communication interface can communicate over one or more networks using a wide variety of communication protocols. The communication interface can include a data bus or a combination of wired and/or wireless communication links that communicatively couple the controller 172 with other electronic devices.

Figure 2:
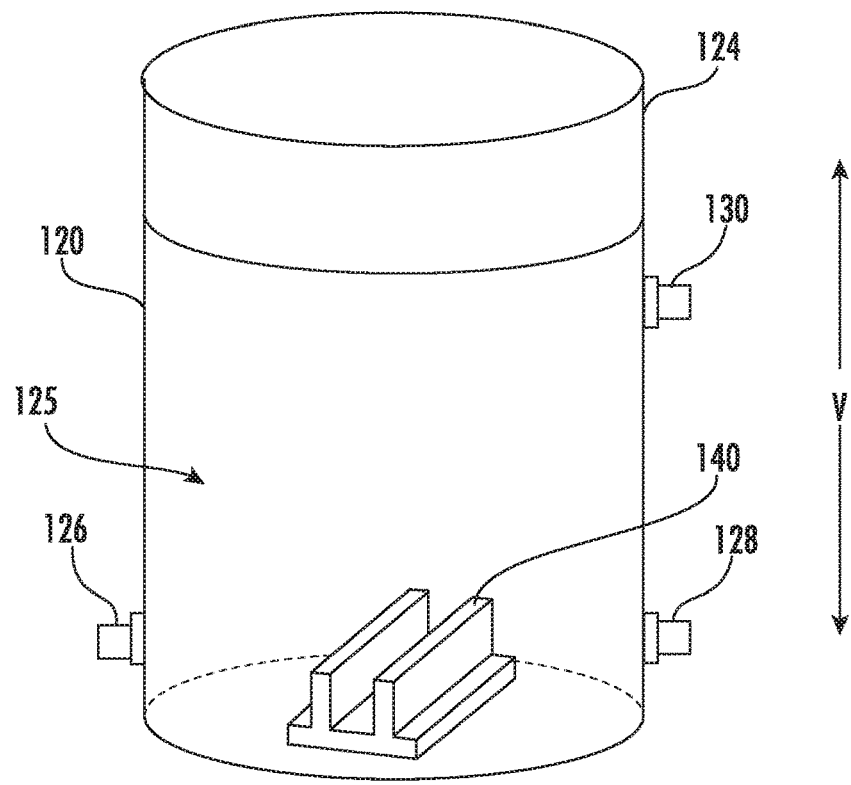
FIG. 2 provides a schematic view of an exemplary vessel depicting a component disposed therein in accordance with exemplary embodiments of the present disclosure.

FIG. 2 provides a close-up, schematic view of the vessel 120 of FIG. 1 depicting the component 140 disposed therein. The vessel 120 includes an access member 124 that is movable between a sealed closed position (shown in FIG. 2) and an open position, e.g., for providing selective access to the volume 125 of the vessel 120. Although the access member 124 is shown as a top cover in the depicted embodiment of FIG. 2, the access member 124 may be positioned elsewhere and may provide selective access to other suitable locations to vessel 120. For instance, the access member 124 may be a door rotatably mounted to the vessel 120. Moreover, in some embodiments, the vessel 120 may include multiple access members. For instance, in some embodiments, the vessel 120 may include a top cover and a bottom cover that are both movable (at the same or different times) between a sealed closed position and an open position.

With reference to FIGS. 1 and 2, the vessel 120 includes an inlet port 126 defining an inlet to the vessel 120, a vacuum port 128, and an outlet port 130 defining an outlet or pressure release outlet. As best shown in FIG. 1, conduits 132, 134, 136 may be selectively connected to the ports 126, 128, 130, respectively, when the vessel 120 is mounted within the chamber 110 of the thermal system 100. In some embodiments, one or more of the ports 126, 128, 130 may include a valve that is selectively movable between an open position in which fluid may flow or pass through the port and a closed position in which fluid is prevented or restricted from flowing or passing through the port. In other embodiments, valves may be positioned upstream or downstream of the ports 126, 128, 130 along the conduits 132, 134, 136 for selectively allowing a fluid flow to or from the volume 125 of the vessel 120. Moreover, as shown in FIG. 1, the thermal system 100 includes a heat source 114 for selectively heating the contents within the chamber 110 during thermal processing, such as e.g., the component 140 disposed within the volume 125 of the vessel 120. The heat source 114 may be any suitable heating source. For instance, the heat source 114 may be a radiative heat source, a resistive heat source, and/or an inductive heat source. In some embodiments, the thermal system 100 may include multiple heat sources.

As noted above, the composite component 140 may be a CMC component, such as e.g., a shroud segment of a gas turbine engine. However, the composite component 140 may be other suitable components. For instance, the composite component 140 may be other components positioned along a hot gas path of a gas turbine engine, such as components positioned within a combustion section, a high pressure turbine, and/or a low pressure turbine of a gas turbine engine. As shown in FIG. 2, in some embodiments, a single composite component may be disposed within the vessel 120 and thermally processed. However, in some embodiments, multiple composite components 140 may be thermally processed at once as described below.

Figure 3:
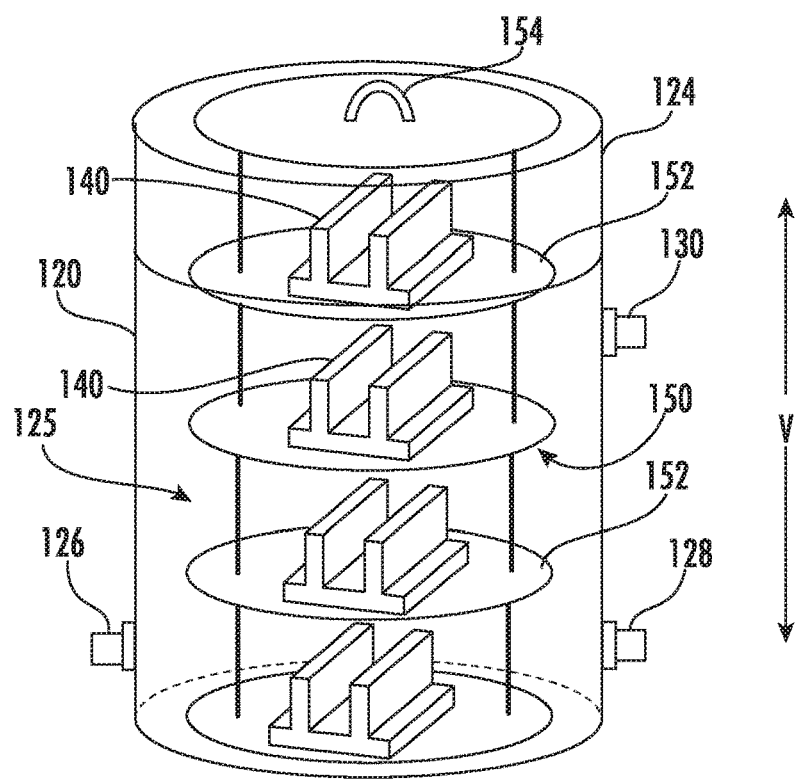
FIG. 3 provides a schematic view of another exemplary vessel depicting a plurality of components disposed therein in accordance with exemplary embodiments of the present disclosure.

FIG. 3 provides a schematic view of another exemplary vessel 120 depicting a plurality of components 140 disposed therein. Although only one component 140 is shown disposed within the volume 125 of the vessel 120 of FIG. 2, in some embodiments, multiple components 140 may be disposed within the volume 125 of the vessel 120 as depicted in FIG. 3. As illustrated in FIG. 3, the components 140 may be positioned or mounted on a rack 150. More particularly, the rack 150 may include one or more shelves 152 on which one or more components 140 may be positioned. The rack 150 also includes an attachment member 154 that provides an attachment means for a mover device to attach to the rack 150 so that the mover device may move the rack 150 into and out of the vessel 120, e.g., when access member 124 is in the open position. For instance, the mover device 160 may be a crane or robot arm. The attachment member 154 may be a hook or loop, for example.

Exemplary CMC materials utilized for such composite components 140 can include silicon carbide, silicon, silica, or alumina matrix materials and combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

An exemplary fabrication process for such CMC components can include laying up one or more layers formed of "prepregs," or tape-like structures that include a reinforcement material (e.g., carbon fibers) impregnated with a slurry that contains a precursor of matrix material and one or more organic binders. The prepreg tapes undergo processing (including firing) to convert the precursor to the desired ceramic. Multiple plies of the resulting prepregs are then stacked and debulked to form a preform.

Thereafter, the preform can undergo thermally processing. Particularly, the preform component can undergo a compaction process, a burnout process, and a consolidation process, e.g. a melt infiltration process, a polymer impregnation and pyrolysis process, or a chemical vapor infiltration process to cure the preform. Such thermal processes may be performed by the thermal system 100 as will be explained in greater detail herein. After the layup process, the preform can be compacted and subjected to elevated temperatures and pressures. The compaction process transitions the preform from a preform to a green state component. Various volatiles can be removed during compaction. Subsequently, the green state component can undergo a burnout process to "burn out" excess binders or the like. More particularly, heating (i.e., firing) the green state component in a vacuum or inert atmosphere decomposes the binders, removes the solvents, and converts the precursor to the desired pyrolyzed material. The burnout process transitions the green state component into a burnt out component. Next, the burnt out component may undergo a melt-infiltration process in which silicon or another suitable material is fired to melt infiltrate the component. The decomposition of the binders in the burnout process results in a porous pyrolyzed burnt out component. The burnt out component may undergo densification, e.g., melt infiltration (MI), polymer impregnation and pyrolysis (PIP), chemical vapor infiltration (CVI), to fill the porosity. In one example, where the pyrolyzed component is fired with silicon, the component can undergo silicon melt-infiltration. In some embodiments, densification and firing may be conducted at temperatures above 1200° C. to allow silicon or other appropriate material or combination of materials to melt-infiltrate into the component. Thereafter, the densified composite component can be finish machined as necessary to form the final composite component. For instance, the component can be grinded or otherwise machined, e.g., to bring the component within tolerance and to shape the component to the desired shape. An exemplary manner in which a composite component may be thermally processed is provided below.

Figure 4A:
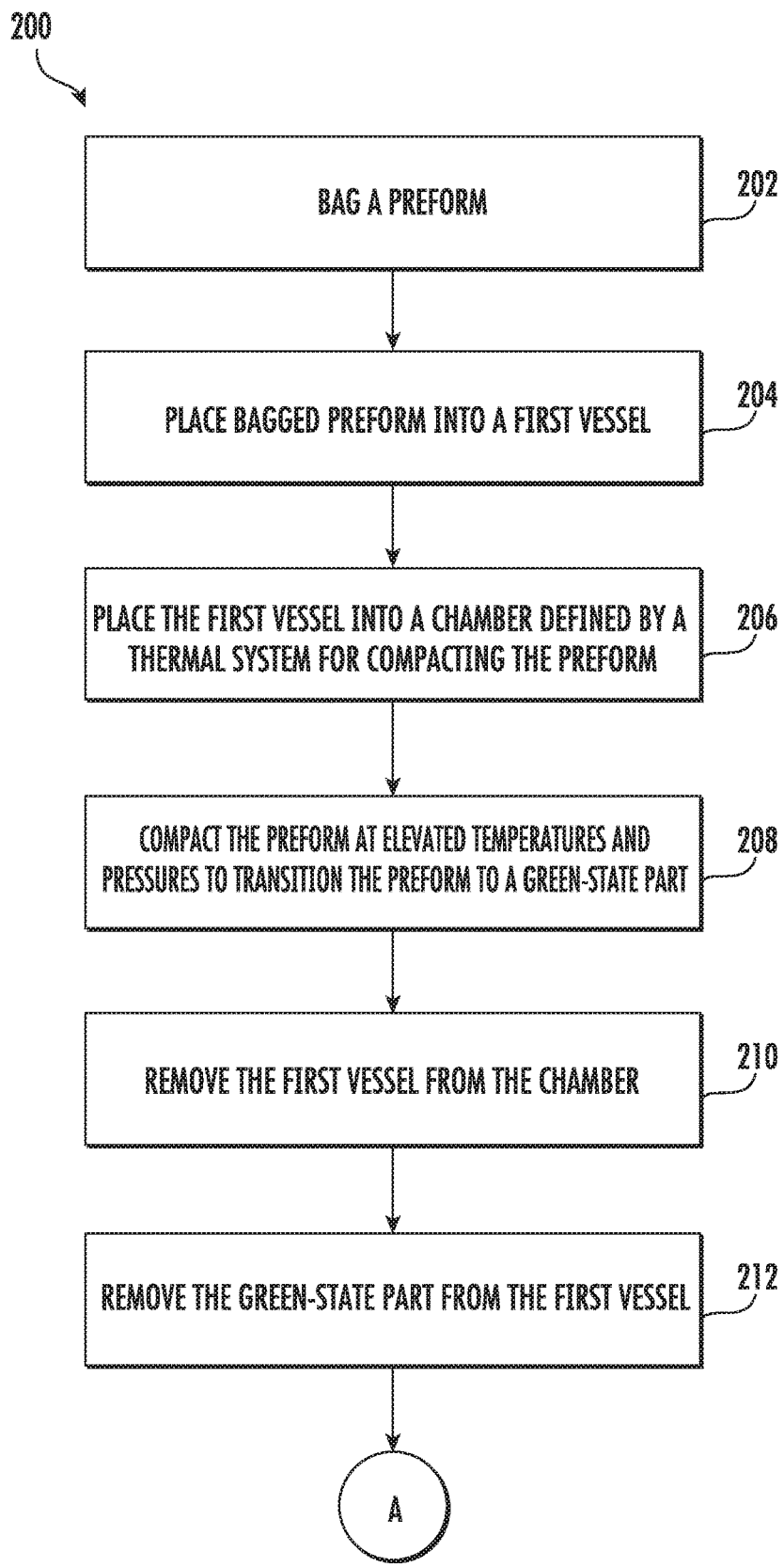
FIGS. 4A, 4B, and 4C provide a flow diagram for an exemplary method for thermally processing a composite component in accordance with exemplary embodiments of the present disclosure.
Figure 4B:
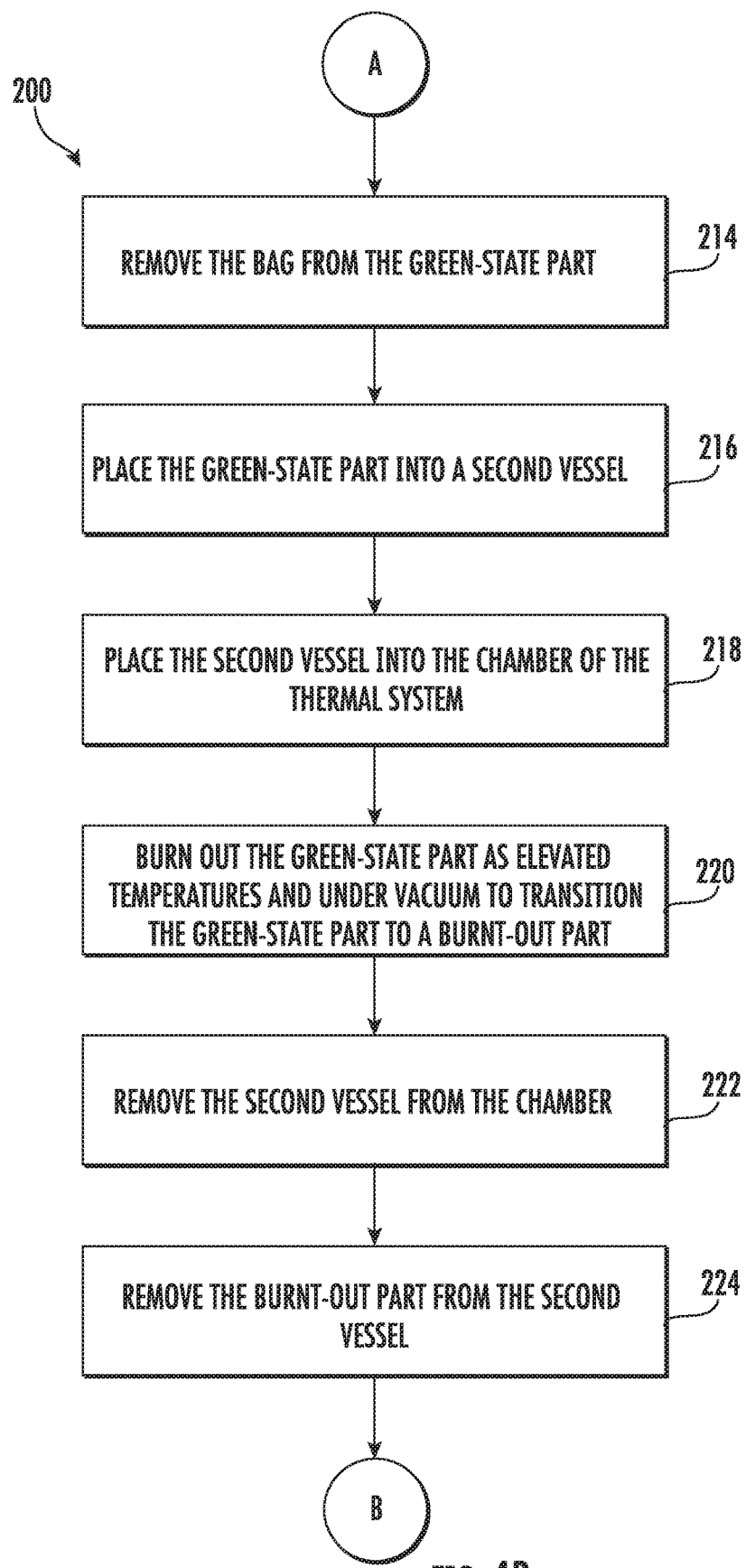
Figure 4C:
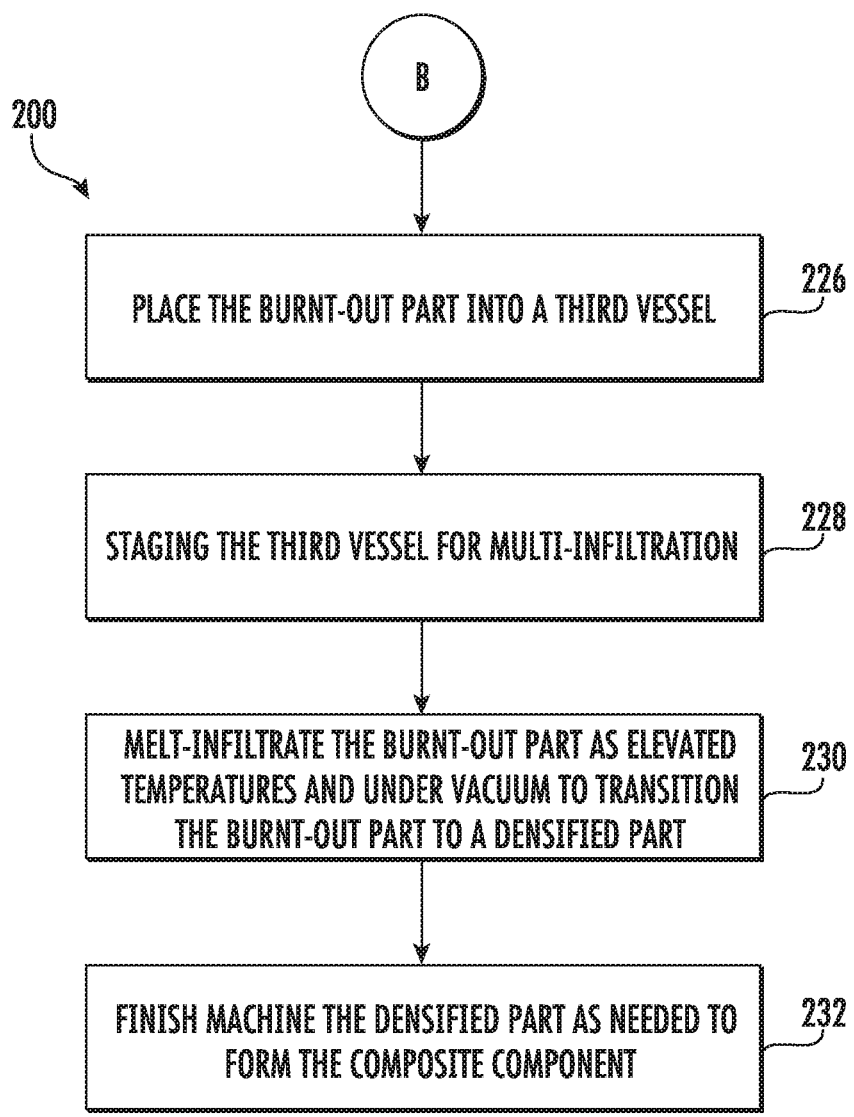
Figure 5:
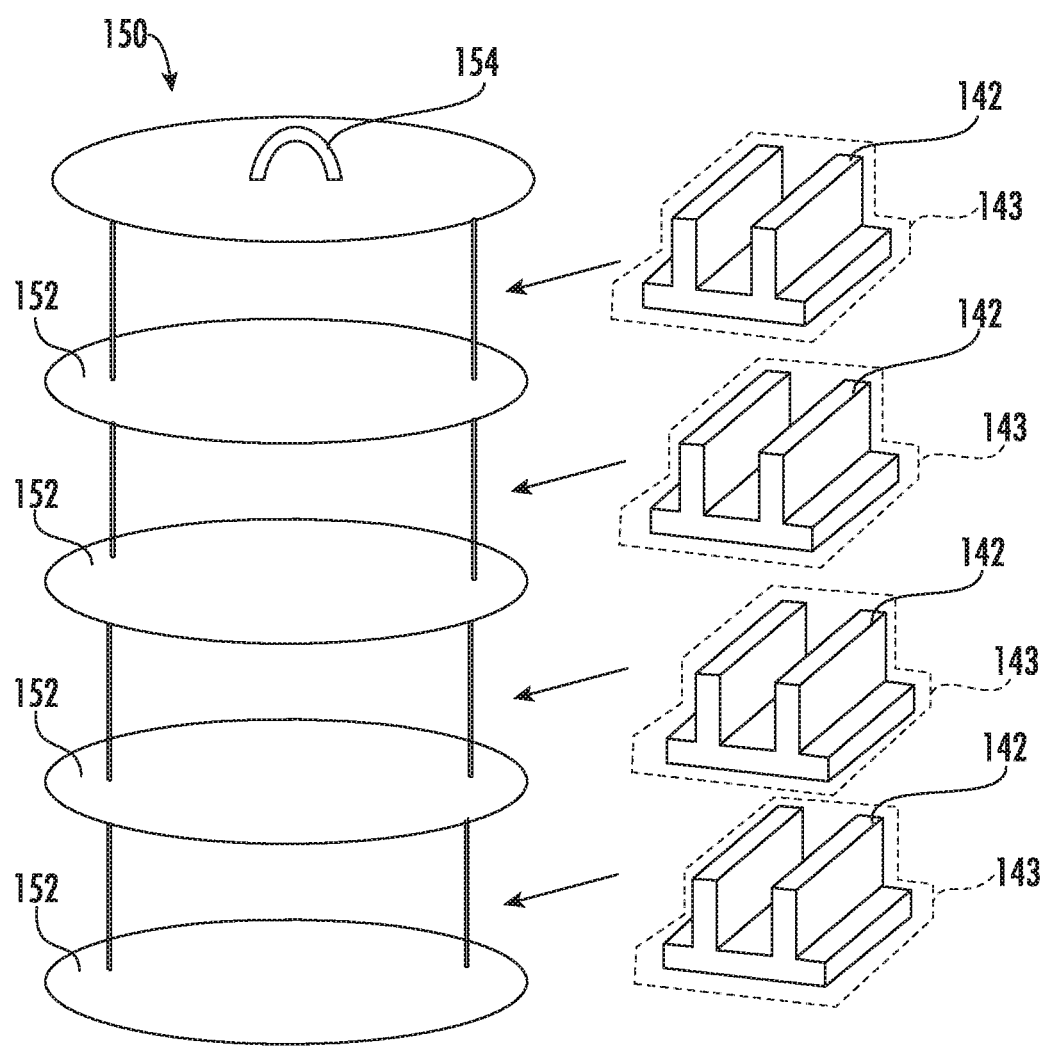
FIG. 5 provides a schematic view of a plurality of preforms being placed into position on a rack.
Figure 6:
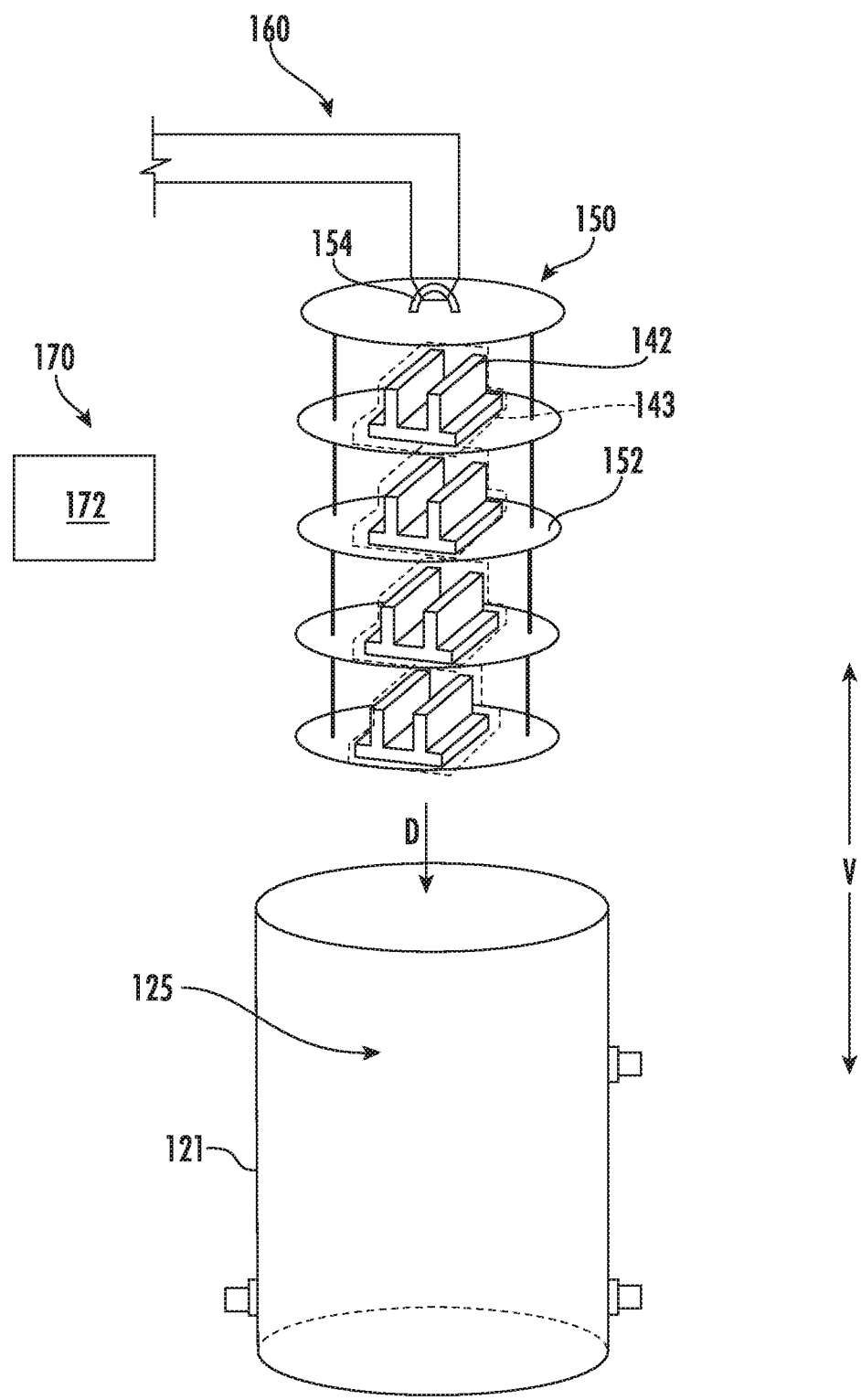
FIG. 6 provides a schematic view of the rack of FIG. 5 with a plurality of preforms disposed thereon being placed into a vessel.
Figure 7:
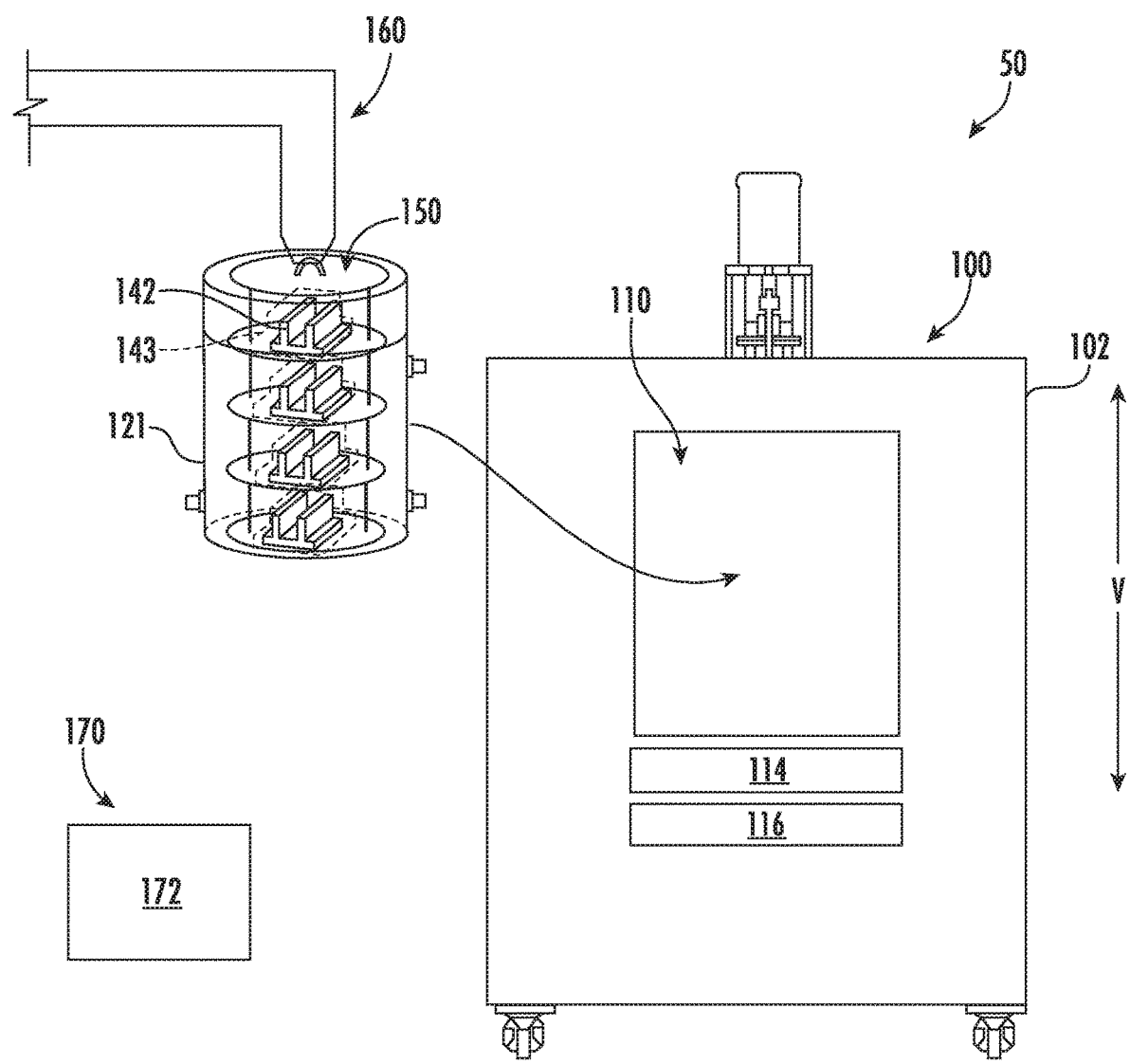
FIG. 7 provides a schematic view of the vessel of FIG. 6 being placed into a chamber of a thermal system.
Figure 8:
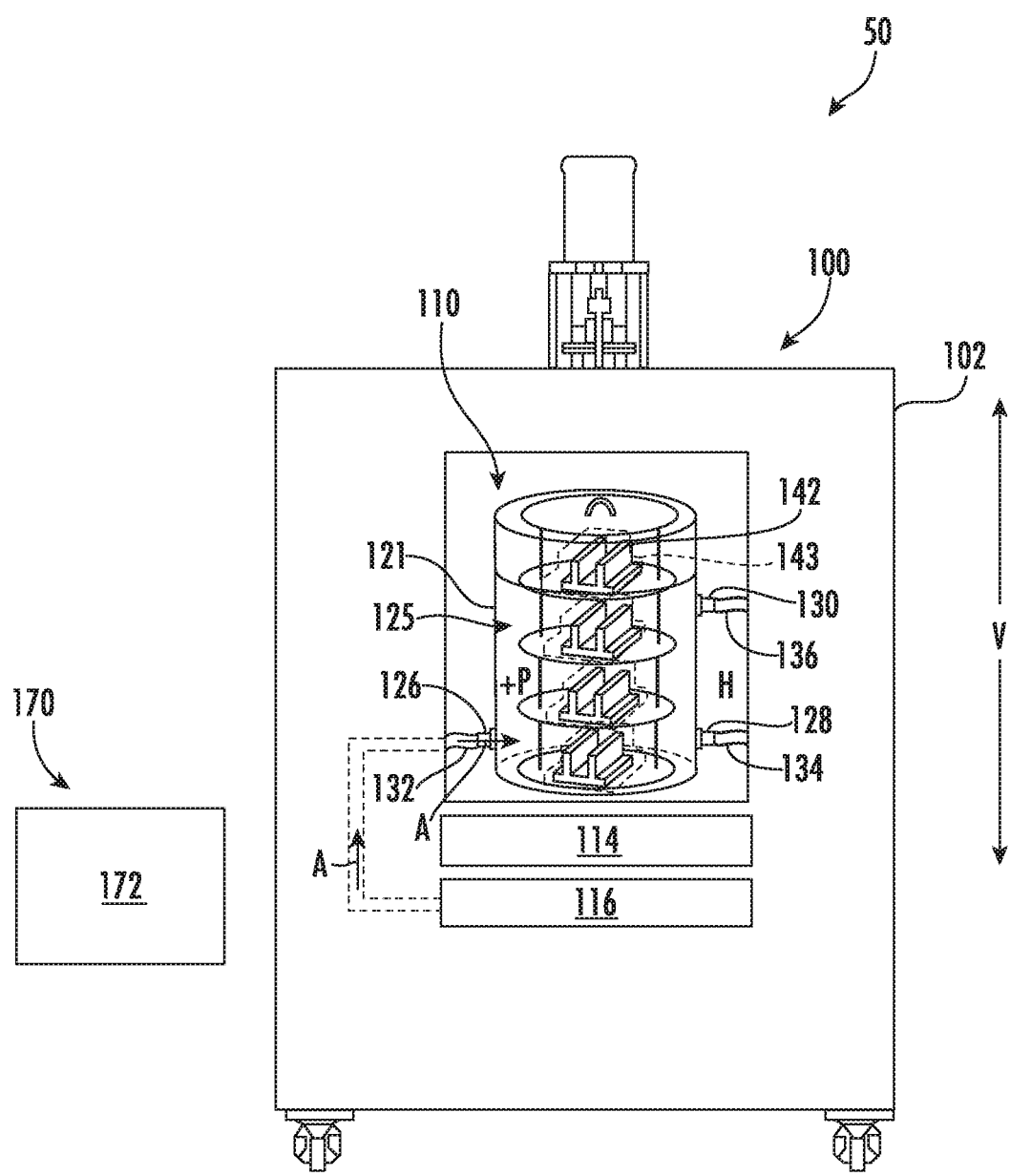
FIG. 8 provides a schematic view of the preforms undergoing a compaction process to transition the preforms to green-state parts.
Figure 9:
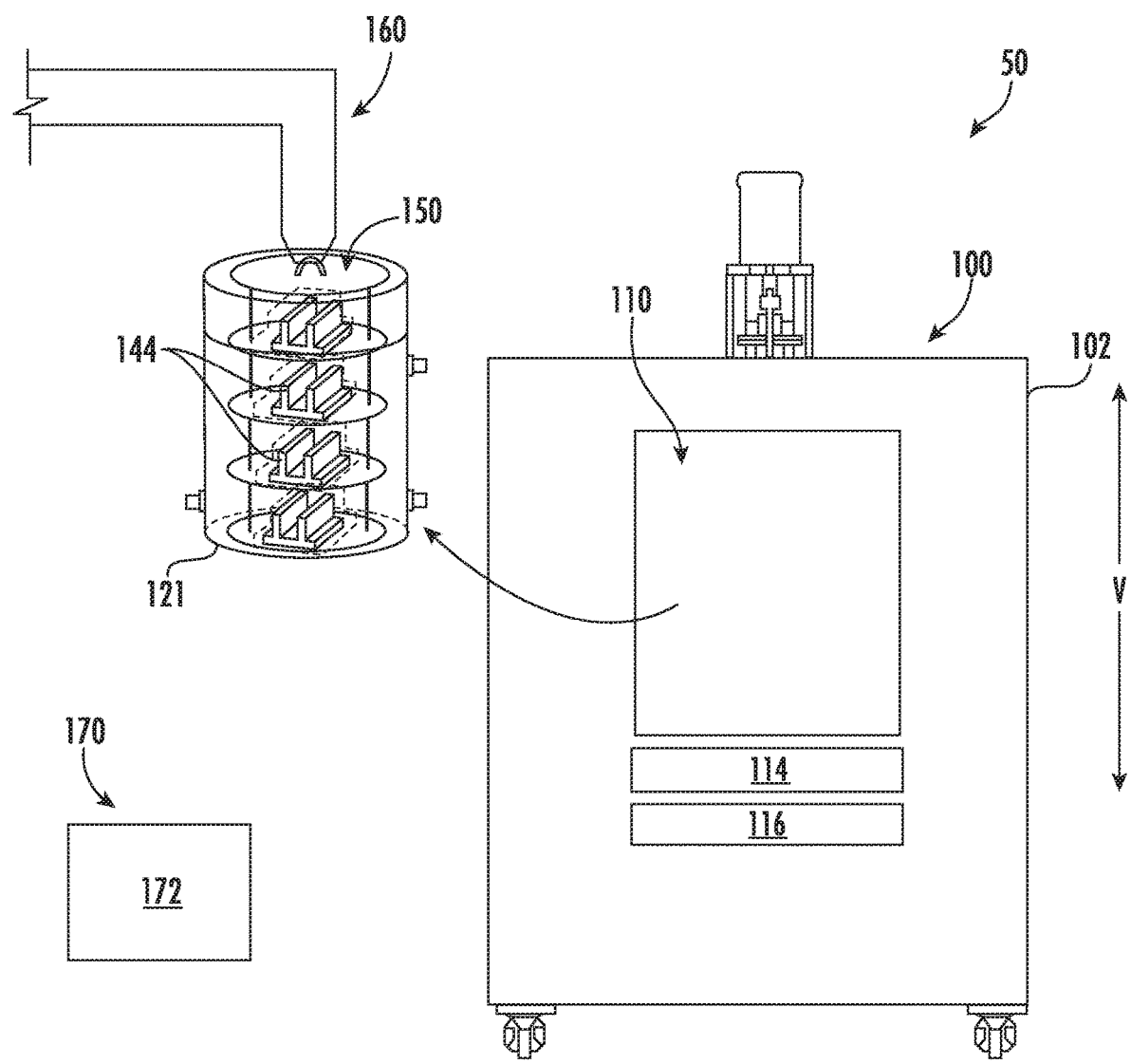
FIG. 9 provides a schematic view of the vessel being removed from the chamber of the thermal system.
Figure 10:
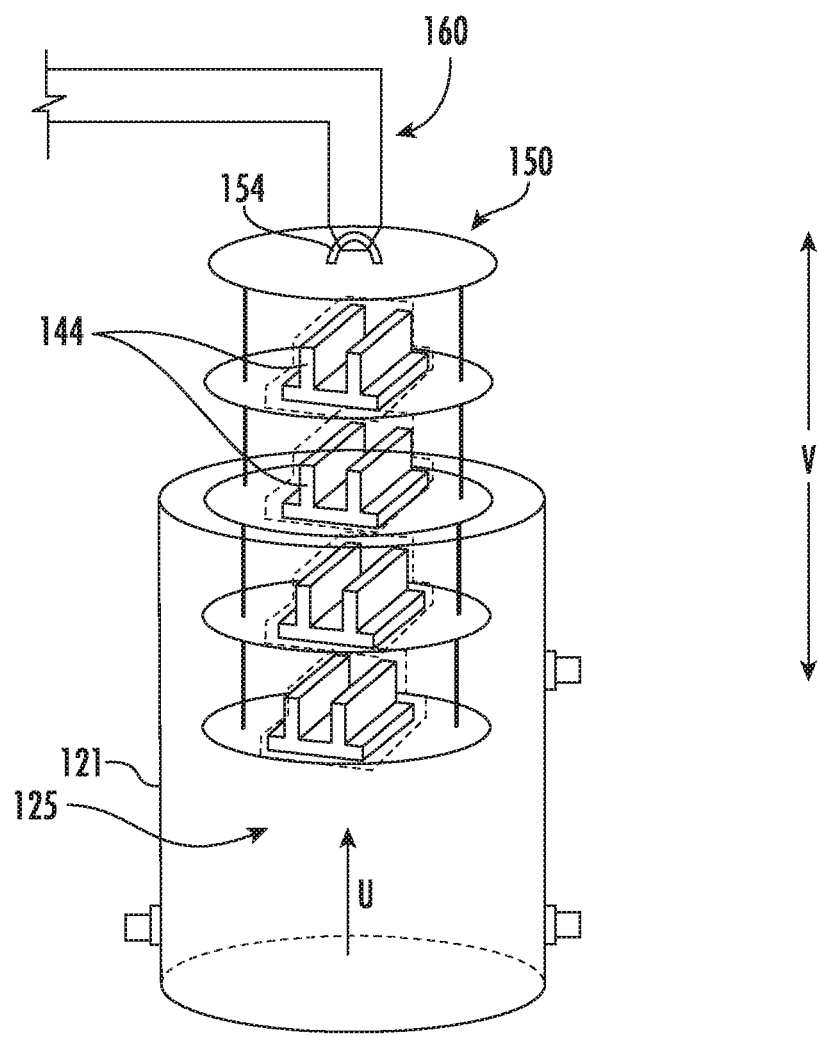
FIG. 10 provides a schematic view of the green-state parts being removed from the vessel.
Figure 11:
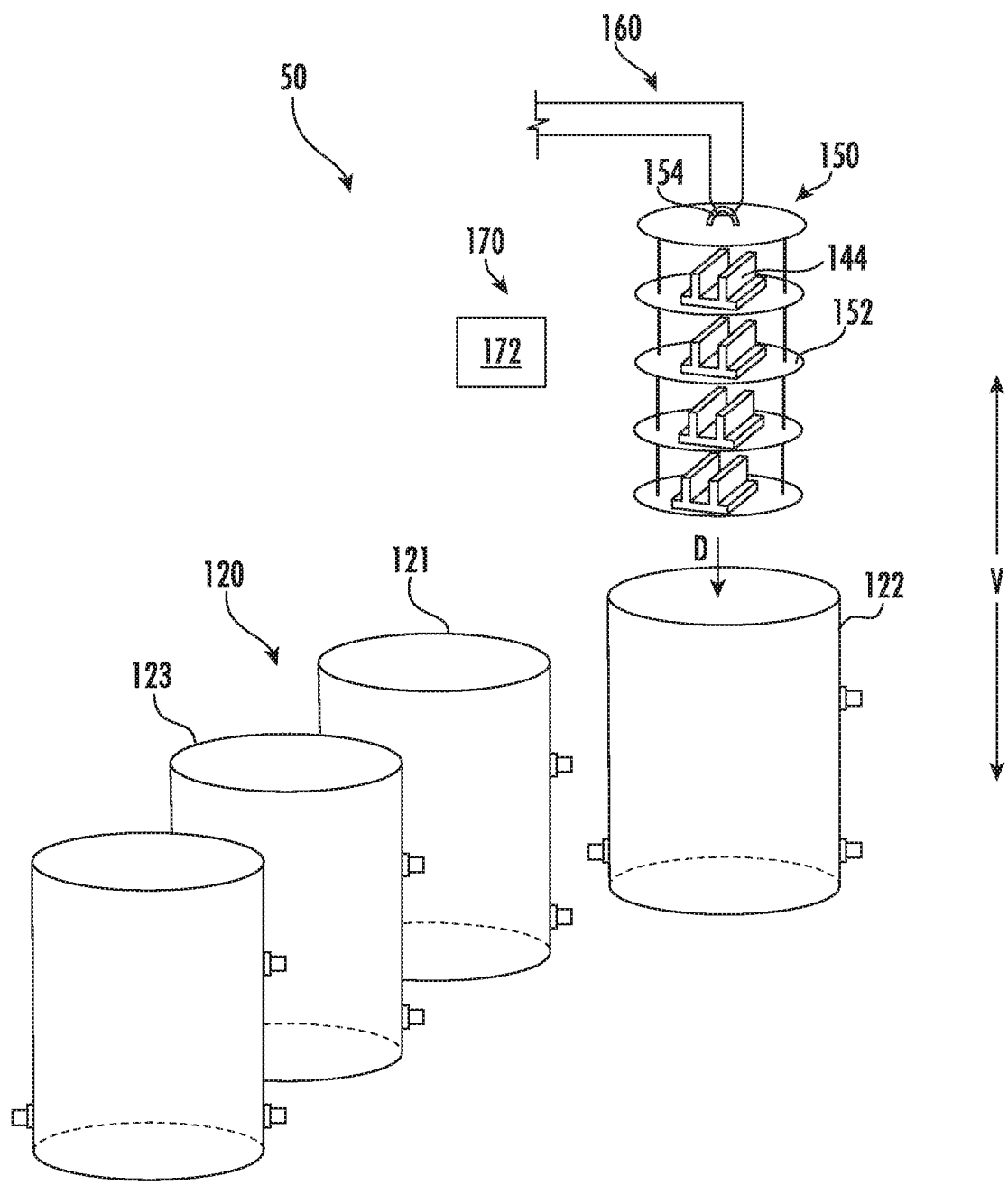
FIG. 11 provides a schematic view of the green-state parts being placed into the same or similarly shaped vessel.
Figure 12:
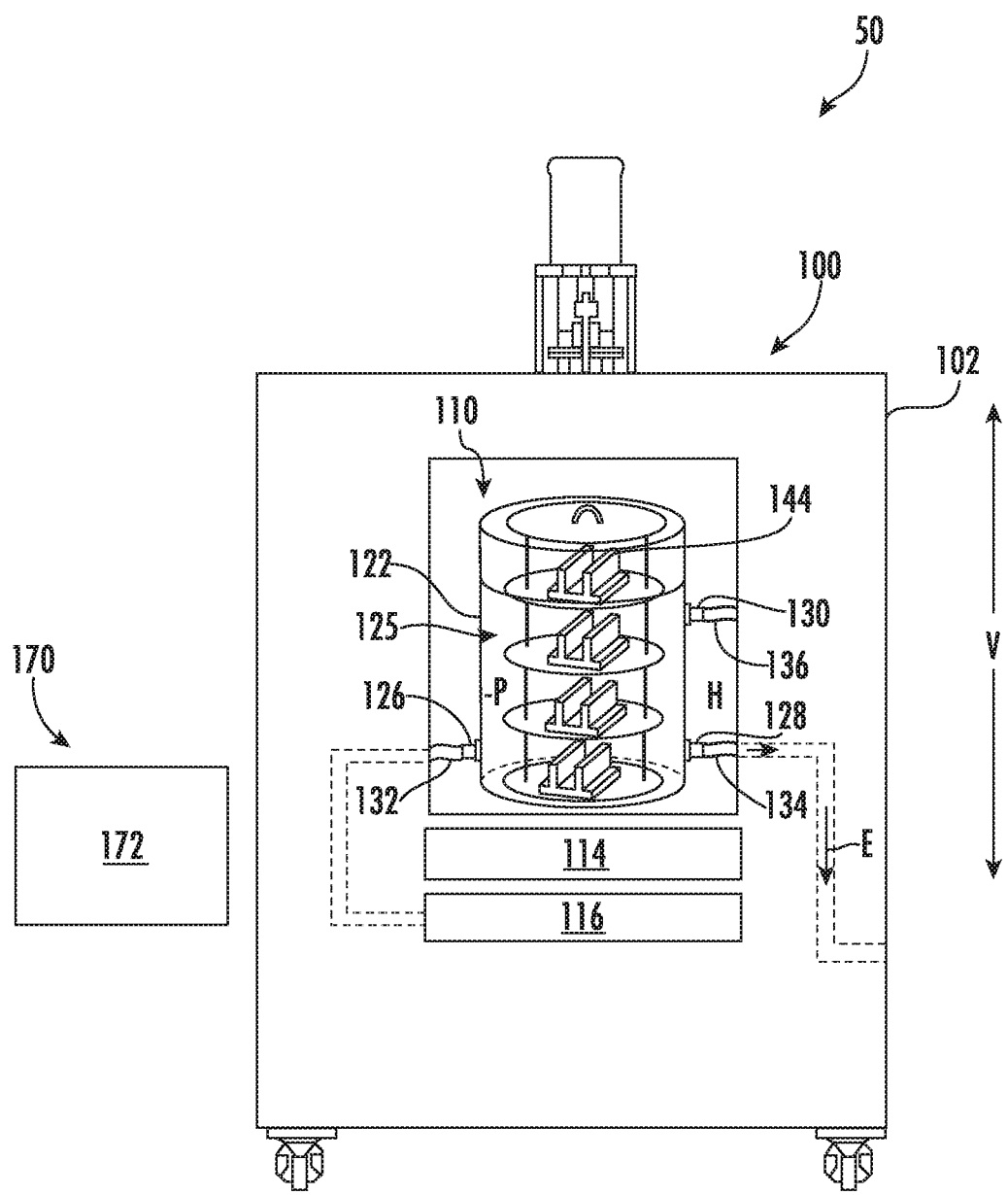
FIG. 12 provides a schematic view of the green-state parts undergoing a burnout process to transition the green-state parts to burnt-out parts.
Figure 13:
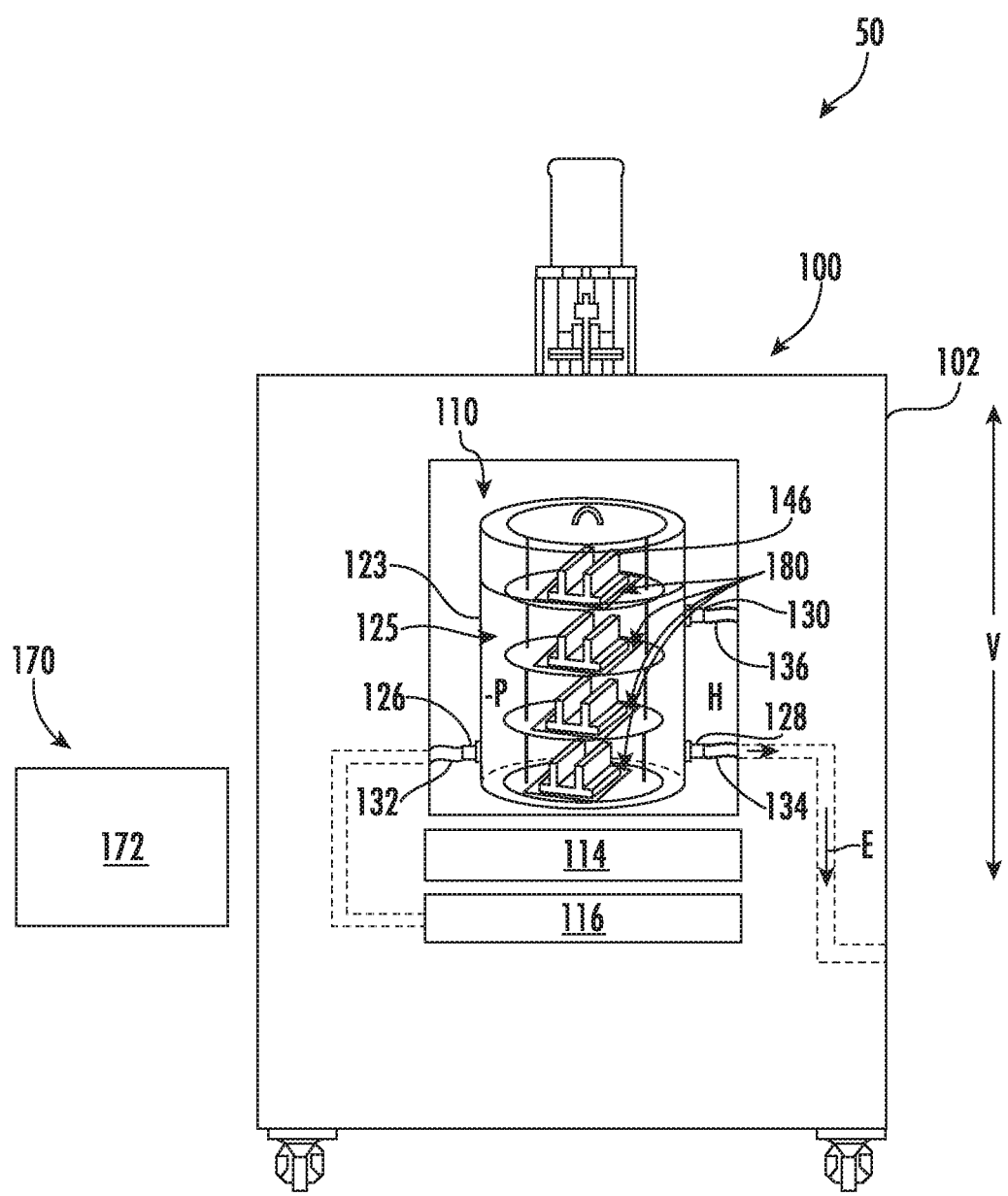
FIG. 13 provides a schematic view of burnt-out parts undergoing a melt-infiltration process.

Referring now generally to FIGS. 4A through 13, an exemplary method (200) for thermally processing a composite component (or multiple composite components) in accordance with exemplary embodiments of the present disclosure is provided. In particular, FIGS. 4A, 4B, and 4C provide a flow diagram of the method (200). For instance, one or more composite components may be thermally processed with the thermal system 100 of FIG. 1 in accordance with the method (200). In some implementations, some or all of the method (200) may be implemented manually. In yet other implementations, some or all of the method (200) may be implemented automatically. FIG. 5 provides a schematic view of a plurality of preforms being placed into position on a rack. FIG. 6 provides a schematic view of the rack of FIG. 5 with a plurality of preforms disposed thereon being placed into a vessel. FIG. 7 provides a schematic view of the vessel of FIG. 6 being placed into a chamber of a thermal system. FIG. 8 provides a schematic view of the preforms undergoing a compaction process to transition the preforms to green-state parts. FIG. 9 provides a schematic view of the vessel being removed from the chamber of the thermal system. FIG. 10 provides a schematic view of the green-state parts being removed from the vessel. FIG. 11 provides a schematic view of the green-state parts being placed into the same or similarly shaped vessel. FIG. 12 provides a schematic view of the green-state parts undergoing a burnout process to transition the green-state parts to burnt-out parts. FIG. 13 provides a schematic view of burnt-out parts undergoing a melt-infiltration process.

At (202), as shown in FIG. 4A, the method (200) includes bagging a preform. More particularly, after a preform is laid up, the preform may be bagged within a bag under vacuum to form a bagged preform. For instance, as shown in FIG. 5, a plurality of performs 142 (i.e., a plurality of composite components in a preform state) are each shown bagged or placed within a bag 143 (represented by phantom lines in FIG. 5) under vacuum to form a bagged preform. As will be further described herein, after during compacting, the preforms 142 are bagged preforms. Further, after compacting, the bags 143 are removed from the now green-state parts.

At (204), with reference to FIG. 4A, the method (200) includes placing the bagged preforms into a first vessel. For instance, as shown in FIG. 5, after the preforms 142 are bagged at (202) within bags 143, the bagged preforms are placed onto the shelves 152 of the rack 150. In this example, one bagged preform is placed on each shelf 152 of the rack 150. However, in other examples, more or less than one bagged preform may be placed on each shelf 152 of the rack 150. As shown in FIG. 6, after the bagged preforms are placed onto the shelves 152 of the rack 150, the rack 150 with the bagged preforms positioned in the shelves 152 of the rack 150 is inserted into a first vessel 121. The first vessel 121 may be the vessel 120 described above or may be a similarly configured vessel. In some implementations, the rack 150 with bagged preforms is inserted into the first vessel 121 (with access member 124 removed to the open position) by mover device 160. The mover device 160 lowers the rack 150 downward along the vertical direction V (depicted by the arrow D) such that the rack 150 and bagged preforms are inserted into the volume 125 of the first vessel 121. The mover device 160 is connected to the rack 150 at attachment member 154. For this implementation, the control system 170 instructs or controls the mover device 160 to move the rack 150 into the first vessel 121 and the mover device 160 performs the operation automatically. In alternative implementations, the rack 150 may be inserted into the first vessel 121 manually.

At (206), with reference again to FIG. 4A, the method (200) includes placing the first vessel having a preform disposed therein into a chamber defined by a thermal system. For instance, in some implementations with reference to FIG. 7, after the rack 150 with the bagged preforms positioned thereon is inserted into the first vessel 121 by the mover device 160 (as shown in FIG. 6), the mover device 160 moves or places the first vessel 121 with the bagged preforms disposed therein into the chamber 110 defined by the thermal system 100. The control system 170 may control the mover device 160 to automatically place the first vessel 121 into the chamber 110. In alternative embodiments, however, the first vessel 121 with the bagged preforms disposed therein may be placed into the chamber 110 manually.

At (208), with reference again to FIG. 4A, the method (200) includes compacting, by the thermal system, the preform within the vessel at an elevated temperature and an elevated pressure to transition the preform to a green-state part. For instance, as shown in FIG. 8, the thermal system 100 is shown compacting the bagged preforms 142. Particularly, during the compaction process, the thermal system 100 may heat the chamber 110 using the heating source 114. Thus, the first vessel 121 and preforms 142 disposed therein may be heated to elevated temperatures as denoted by the "H" in FIG. 8.

Moreover, the thermal system 100 may provide pressurized air to the volume 125 of the first vessel 121 via conduit 132. Prior to compacting, a pressurized fluid source 116 is connected in fluid communication with the volume 125 defined by the first vessel 121. The pressurized fluid source 116 may be compressed air stored within a tank of the thermal system 100, for example. The thermal system 100 may include a compressor for pressurizing air and a pump for moving the pressurized air to the first vessel 121. The compressor and pump may be located onboard or offboard the thermal system 100. Pressurized air, denoted by arrows A, may enter the volume 125 of the first vessel 121 through the inlet port 126 to compact the composite components 140 disposed therein. During compacting, the volume 125 of the first vessel 121 is sealed and pressurized air A from the pressurized fluid source 116 is provided to the volume 125 to pressurize the volume 125 at elevated pressures and temperatures. As shown in FIG. 8, application of the pressurized air within the volume 125 of the first vessel 121 causes a positive pressure within the first vessel 121, which is denoted by "+P" in FIG. 8. During or at the completion of the compaction process, the pressurized air A may exit the volume 125 of the first vessel 121 through the outlet port 130 and may be exhausted from the chamber 110 through the conduit 136.

By compacting the components 140 within the first vessel 121, less time is required to pressurize the components 140 as the first vessel 121 has a smaller volume 125 than the volume of the chamber 110. Moreover, the heat source 114 may be focused on heating the components 140 within the first vessel 121 instead of the chamber 110 more generally. Thus, heating the components 140 may be achieved more efficiently. Further, as the first vessel 121 is smaller than the chamber 110, there is less thermal mass to heat up and accordingly more rapid part heating may be achieved.

At (210), with reference once again to FIG. 4A, the method (200) includes removing the first vessel from the chamber of the thermal system. For instance, in some implementations with reference to FIG. 9, after compacting at (208), the mover device 160 removes the first vessel 121 with the green-state parts 144 disposed therein from the chamber 110. The control system 170 may control the mover device 160 to automatically remove the first vessel 121 from the chamber 110, e.g., after completion of the compaction process at (208). In alternative embodiments, however, the first vessel 121 with the green-state parts 144 disposed therein may be removed from the chamber 110 manually.

At (212), with reference once again to FIG. 4A, the method (200) includes removing the green-state parts from the first vessel. For instance, as shown in FIG. 10, the mover device 160 may remove the access member 124 (not shown in FIG. 10) and may connect to the rack 150 via attachment member 154. The mover device 160 moves the rack 150 upward along the vertical direction V (depicted by the arrow U) such that the rack 150 and green-state parts 144 are removed from the volume 125 of the first vessel 121. For this implementation, the control system 170 instructs or controls the mover device 160 to remove the rack 150 from the first vessel 121 and the mover device 160 performs the operation automatically. In alternative implementations, the rack 150 may be removed from the first vessel 121 manually.

At (214), with reference to FIG. 4B, the method (200) includes removing the bags from the green-state parts. For instance, after compacting at (208), the bags are removed from the green-state parts. The bags may be removed in any suitable manner. As one example, the mover device 160 or another suitable automatic system may remove the bags from the green-state parts. As another example, the bags may be removed from the green-state parts manually.

At (216), with reference again to FIG. 4B, the method (200) includes placing the green-state parts into a second vessel. In some implementations, the second vessel is the first vessel. Thus, the green-state part may be inserted into the same vessel as was used for the compaction process. In alternative implementations, the second vessel and the first vessel are different but similarly shaped vessels. For instance, the first vessel may have the same or substantially the same geometry as the second vessel. Further, the second vessel may have the same ports 126, 128, 130 and access member 124 (FIG. 2) as the first vessel. Moreover, the ports and access member on the second vessel may be located in the same positions as the ports 126, 128, 130 and access member of the first vessel. Accordingly, the second vessel may be configured in substantially the same way as the first vessel.

As shown in FIG. 11, after the bags are removed from the green-state parts 144 at (214), the green-state parts 144 may be placed onto the shelves of a rack. For instance, the green-state parts 144 may be placed back onto the shelves 152 of the rack 150 used during compaction process or the green-state parts 144 may be placed on a different rack having the same configuration as the rack 150. After the green-state parts 144 are placed onto the shelves 152 of the rack 150, the rack 150 is inserted into a second vessel 122. As noted above, the second vessel 122 may be the same as the first vessel 121 or may be a different vessel but similarly shaped and configured. In some implementations, the rack 150 with the green-state parts 144 positioned thereon is placed into the second vessel 122 (with access member 124 removed to the open position) by mover device 160. The mover device 160 lowers the rack 150 downward along the vertical direction V (depicted by the arrow D) such that the rack 150 and green-state parts 144 are inserted into the volume 125 of the second vessel 122. The mover device 160 is connected to the rack 150 at attachment member 154. For this implementation, the control system 170 instructs or controls the mover device 160 to move the rack 150 into the second vessel 122 and the mover device 160 performs the operation automatically. In alternative implementations, the rack 150 may be placed into the second vessel 122 manually.

At (218), with reference to FIG. 4B, the method (200) includes placing the second vessel having the green-state part disposed therein into the chamber of the thermal system. For instance, in some implementations, the second vessel may be placed into the chamber of the thermal system in the same or substantially the same manner as the first vessel is placed into the chamber as described above at (206). Particularly, after the rack 150 with the green-state parts 144 positioned thereon is inserted into the second vessel 122 by the mover device 160, the mover device 160 moves or places the second vessel 122 into the chamber 110. The control system 170 may control the mover device 160 to automatically place the second vessel 122 into the chamber 110. In alternative embodiments, however, the second vessel 122 with the green-state parts 144 disposed thereon may be placed into the chamber 110 manually.

At (220), with reference to FIG. 4B, the method (200) includes burning out, by the thermal system, the green-state part within the second vessel at an elevated temperature and under vacuum to transition the green-state part to a burnt-out part. During the burnout process at (220), the polymer binder of each of the green-state parts is "burnt out." By way of example, as shown in FIG. 12, the thermal system 100 is shown burning out the green-state parts 144. Particularly, during the burnout process, the thermal system 100 heats the chamber 110 using the heating source 114. Thus, the second vessel 122 and green-state parts 144 disposed therein are heated to elevated temperatures as denoted by the "H" in FIG. 12. Moreover, the thermal system 100 creates a vacuum within the volume 125 of the second vessel 122. That is, the thermal system 100 creates a negative pressure or vacuum within the chamber 110 by moving air from the volume 125 of the second vessel 122 through vacuum port 128 and conduit 136. The negative pressure or vacuum created within the volume 125 of the second vessel 122 is denoted by "–P" in FIG. 12. To create a vacuum within the volume 125 of the second vessel 122, air is drawn or moved out of the volume 125 of the second vessel 122 and exhausted, as denoted by the "E" in FIG. 12, from the thermal system 100. Burning out the green-state parts 144 in a vacuum or inert atmosphere decomposes the binders, removes the solvents, and converts the precursor to the desired pyrolyzed material. The burnout process at (220) transitions the green-state parts 144 into burnt-out parts 146.

By burning out the green-state parts 144 within the second vessel 122, less time is required to create a vacuum within the volume 125 of the second vessel 122 as the second vessel 122 has a smaller volume 125 than the volume of the chamber 110. Moreover, the heat source 114 may be focused on heating the green-state parts 144 within the second vessel 122 instead of the chamber 110 more generally. Thus, heating the green-state parts 144 may be achieved more efficiently. Further, as the second vessel 122 is smaller than the chamber 110, there is less thermal mass to heat up and accordingly more rapid part heating may be achieved.

At (222), with reference to FIG. 4B, the method (200) includes removing the second vessel from the chamber of the thermal system. For instance, in some implementations, the second vessel may be removed from the chamber of the thermal system in the same or substantially the same manner as the first vessel is removed from the chamber as described above at (210). Particularly, in some implementations, after completing the burnout process at (220), the mover device 160 removes the second vessel 122 with the burnt-out parts 146 disposed therein from the chamber 110. The control system 170 may control the mover device 160 to automatically remove the second vessel 122 from the chamber 110, e.g., after completion of the burnout process at (220). In alternative embodiments, however, the second vessel 122 with the burnt-out parts 146 disposed therein may be removed from the chamber 110 manually.

At (224), with reference to FIG. 4B, the method (200) includes removing the burnt-out parts from the second vessel. For instance, in some implementations, the burnt-out parts may be removed from the second vessel in the same or substantially the same manner as the green-state parts are removed from the first vessel as described above at (212). Particularly, in some implementations, the mover device 160 may remove the access member 124 and may connect to the rack 150 via attachment member 154. The mover device 160 may move the rack 150 upward along the vertical direction V such that the rack 150 and burnt-out parts 146 are removed from the volume 125 of the second vessel 122. For this implementation, the control system 170 instructs or controls the mover device 160 to remove the rack 150 from the second vessel 122 and the mover device 160 performs the operation automatically. In alternative implementations, the rack 150 may be removed from the second vessel 122 manually.

At (226), with reference to FIG. 4C, the method (200) includes placing the burnt-out parts into a third vessel. In some implementations, the third vessel is the same vessel as the second vessel. Thus, the burnt-out part may be inserted into the same vessel as was used for the burnt out process. Further, in some implementations, the third vessel is the second vessel, which is the first vessel. Thus, the burnt-out part may be inserted back into the same vessel that was used for the burnout process and the compaction process. In alternative implementations, the third vessel and the second vessel are different but similarly shaped vessels. For instance, the third vessel may have the same or substantially the same geometry as the second vessel. Further, the third vessel may have the same ports 126, 128, 130 and access member 124 (FIG. 2) as the second vessel. Moreover, the ports and access member on the third vessel may be located in the same positions as the ports 126, 128, 130 and access member of the second vessel. Accordingly, the third vessel may be configured in substantially the same way as the second vessel. Moreover, in some implementations, the third vessel may be configured in substantially the same way as the first vessel and/or the second vessel. In some exemplary implementations, as shown best in FIG. 11, the system 50 includes a plurality of vessels 120 that are shaped and configured in substantially the same way. As shown in FIG. 11, the first vessel 121, the second vessel 122, and a third vessel 123 of the plurality of vessels 120 are similarly shaped and configured. Furthermore, in some implementations, the burnt-out parts are placed into the third vessel in the same or substantially the same manner as the green-state parts are placed into the second vessel as described above at (216) and illustrated in FIG. 11.

At (228), with reference again to FIG. 4C, the method (200) includes staging the third vessel for melt-infiltration. The third vessel may be staged before or after placing the burnt-out parts into the third vessel at (226). In some implementations, staging the third vessel includes placing a puck of material adjacent the burnt-out parts disposed within the third vessel, or if the burnt-out parts have not yet been placed into the third vessel, the pucks of material may be placed onto the shelves of the rack at or proximate the location in which the burnt-out parts are to be placed. In some implementations, the puck of material may be formed of a silicon material. In other implementations, the pucks may be formed of other suitable materials for melt infiltrating the porous pyrolyzed burnt-out parts.

At (230), with reference still to FIG. 4C, the method (200) includes melt infiltrating, by the thermal system, the burnt-out part within the third vessel at an elevated temperature and under vacuum to transition the burnt-out part to a densified state. During the melt-infiltration process at (230), the pucks of material "melt infiltrate" or are promoted to melt into the burnt-out parts, e.g., to densify the porous pyrolyzed burnt-out parts. By way of example, as shown in FIG. 13, the thermal system 100 is shown melt infiltrating the burnt-out parts 146. Particularly, during the melt infiltration process, the thermal system 100 heats the chamber 110 using the heating source 114. Heating the chamber 110, denoted by the "H" in FIG. 13, causes the pucks 180 to melt into the burnt-out parts 146. Moreover, the thermal system 100 creates a vacuum within the volume 125 of the third vessel 123. That is, the thermal system 100 creates a negative pressure or vacuum within the chamber 110 by moving air from the volume 125 of the third vessel 123 through vacuum port 128 and conduit 136. The negative pressure or vacuum created within the volume 125 of the third vessel 123 is denoted by "–P" in FIG. 13. To create a vacuum within the volume 125 of the third vessel 123, air is drawn or moved out of the volume 125 of the third vessel 123 and exhausted, as denoted by the "E" in FIG. 13, from the thermal system 100. Melt-infiltrating the burnt-out parts 146 at elevated temperatures under vacuum densifies the burnt-out parts 146, e.g., by filling the porosity with the pucks 180. In some implementations, the pucks 180 are formed of silicon. The melt-infiltration process at (230) transitions the burnt-out parts 146 into a densified part 148. In some alternative implementations, at (230) the method (200) includes densifying, by the thermal system, the burnt-out part within the third vessel at an elevated temperature and under vacuum to transition the burnt-out part to the composite component.

In some implementations, as noted above, densifying the burnt-out parts at (230) includes melt-infiltrating the burnt-out part within the third vessel at an elevated temperature and under vacuum. In some alternative implementations, instead of melt-infiltrating at (230), the method (200) includes chemical vapor infiltrating, by the thermal system, the burnt-out part within the third vessel to transition the burnt-out part to a densified state. For instance, in some implementations, chemical vapor infiltrating at (230) includes flowing a gaseous precursor into the third vessel. The gaseous precursor may be flowed into the third vessel at elevated temperatures. The gaseous precursor flow into the third vessel through the inlet port 126 or another dedicated port. The gaseous precursor may be a number of suitable compounds, including e.g., methyltrichlorosilane, trichlorosilane, other silicon-containing precursors, boron-containing precursors, etc. Further, in some implementations, a mass flow controller may be utilized to control the mass flow of the gaseous precursor into the third vessel to densify the burnt-out part to the desired density. The mass flow controller may be communicatively coupled with the one or more controllers 172 and thus may be controlled by the controllers 172.

In yet other alternative implementations, instead of melt-infiltrating at (230), the method (200) includes impregnating and pyrolyzing, by the thermal system, the burnt-out part within the third vessel to transition the burnt-out part to a densified state. For instance, in some implementations, impregnating and pyrolyzing at (230) includes impregnating the burnt-out part with a polymer resin within the third vessel at elevated temperatures and under vacuum. The polymer resin may be any suitable silicon-containing resin, including e.g., polymethylsilane, polysilazane, etc. Once impregnated or infiltrated with the polymer resin, the burnt-out part may be pyrolyzed at elevated temperatures and re-impregnated or infiltrated with a polymer resin as described above. The burnt-out parts may be impregnated and pyrolyzed repeatedly in an iterative process to achieve the target part density or mechanical properties. The mover device 160 may move the third vessel to and from the chamber 110 during the iterative during impregnating and pyrolyzing at (230).

At (232), the method (200) includes finish machining the densified part as needed to form the composite component. For instance, as noted previously, the densified part 148 can be grinded or otherwise machined, e.g., to bring the component within tolerance and to shape the component to the desired shape.

The method (200) described above provides a number of advantages and benefits. For instance, the method (200) may be implemented using a single thermal system to thermally process composite components. Thus, the composite components need not be moved about from system to system to compact, burn out, and densify the composite components. This may save time, resources, floor space, and provides greater flexibility to thermally processing components. Moreover, the common configuration and shape of the vessels of the system makes thermally processing components more amenable to automation. For instance, a mover device may be controlled by a control system as noted above to insert and remove components to and from the vessels and may also be controlled to mount or remove vessels to and from the chamber of the thermal system. The common vessel design facilitates controlled and repeatable movement of the components throughout thermal processing. Moreover, as each vessel is similarly shaped and configured, each vessel may be used for any of the compaction, burn out, and melt-infiltrate or densification processes. For instance, as noted above, each vessel may include inlet and outlet ports (used primarily during compaction) as well as a vacuum port (used primarily during burn out and melt-infiltration). Thus, the same vessel may be used for compaction, burn out, and melt-infiltration or the components may be switched between standard or common configuration vessels between processes in an efficient manner. Furthermore, as the vessels have smaller volumes than the chamber of the thermal system, the time and energy required to pressurize the vessel during compaction and create a vacuum in during burn out and melt-infiltration is reduced. Moreover, a reduction in the thermal mass allows for more rapid part heating. In addition, the method (200) may have other advantages and benefits not specifically mentioned above.

Figure 14:
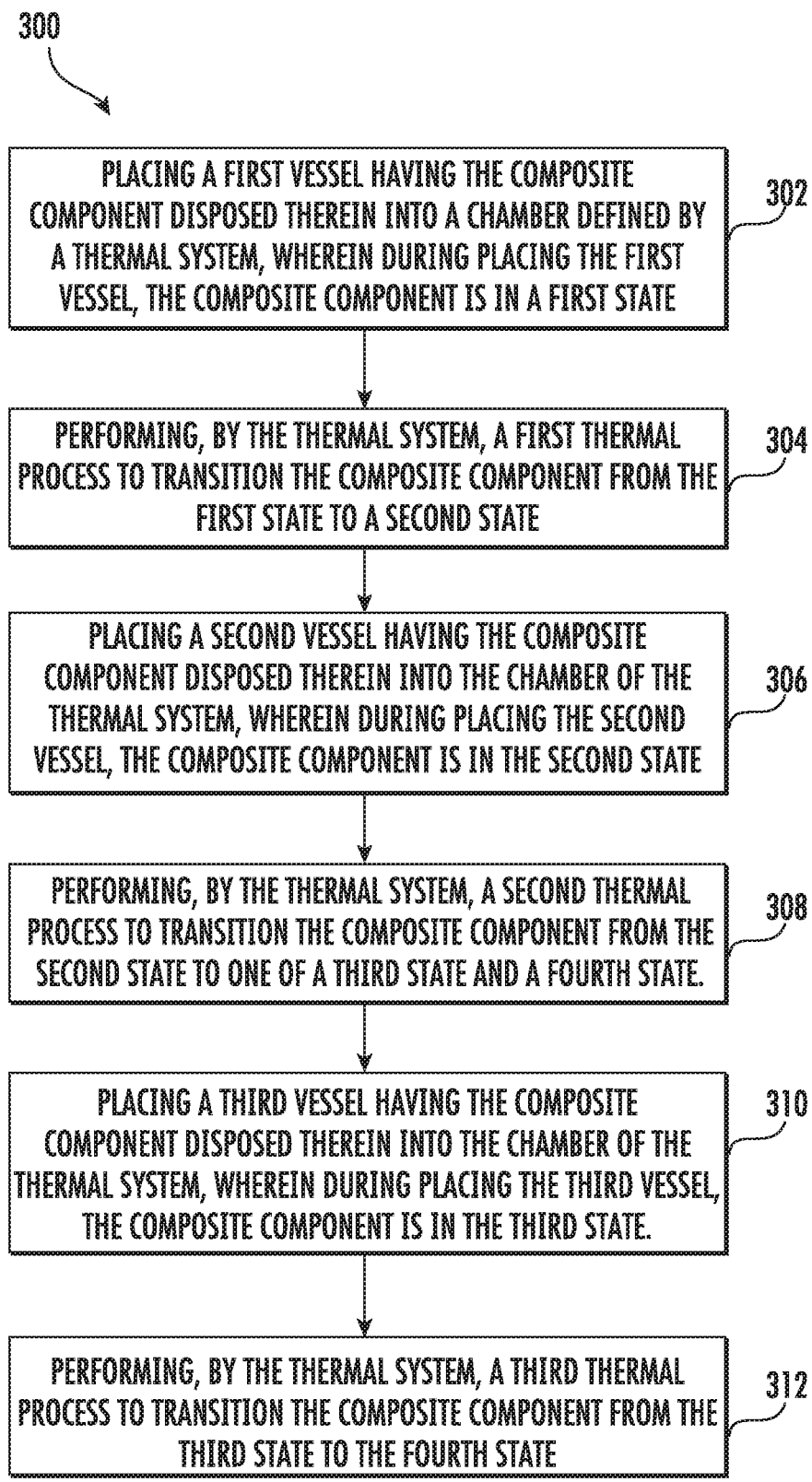
FIG. 14 provides a flow diagram for an exemplary method for manufacturing a composite component in accordance with exemplary embodiments of the present disclosure.

FIG. 14 provides a flow diagram of an exemplary method (300) for manufacturing a composite component. For instance, one or more composite components may be thermally processed with the thermal system 100 of FIG. 1 in accordance with the method (300). In some implementations, some or all of the method (300) may be implemented manually. In yet other implementations, some or all of the method (300) may be implemented automatically.

At (302), the method (300) includes placing a first vessel having the composite component disposed therein into a chamber defined by a thermal system, wherein during placing the first vessel, the composite component is in a first state. For instance, the first vessel may be the first vessel 121 and the thermal system may be the thermal system 100 of system 50 as described herein. The chamber may be defined by the housing 102 of the thermal system 100. In some implementations, a control system may control a mover device, such as the mover device 160 described herein, to place the first vessel into the chamber of the thermal system. Moreover, in some implementations, the first state is one of a preform state and a green state. Stated differently, at (302), the composite component may be a preform or bagged preforms or may be a green-state part (i.e., a preform that has already undergone compacting).

At (304), the method (300) includes performing, by the thermal system, a first thermal process to transition the composite component from the first state to a second state. In some implementations, the first thermal process is one of a compaction process and a burnout process. For example, if the first state of the composite component is a preform state, then the first thermal process may be a compaction process so that the preform may be compacted, e.g., in a manner as described herein. In such implementations, the first thermal process, or compaction process, may transition the composite component from the first state (i.e., a preform state) to a second state (i.e., a green state). As another example, if the first state of the composite component is a green state, then the first thermal process may be a burnout process so that the green-state part may be burnt out, e.g., in a manner as described herein. In such implementations, the first thermal process, or burnout process, may transition the composite component from the first state (i.e., a green state) to a second state (i.e., a burnt-out state). The control system may activate the thermal system to automatically perform the first thermal process, e.g., after the first vessel is placed within the chamber and the port connections are made, or the thermal system may be activated manually to start the first thermal process. For instance, an operator may commence the operation by selecting the desired thermal process and pushing a start button.

At (306), the method (300) includes placing a second vessel having the composite component disposed therein into the chamber of the thermal system, wherein during placing the second vessel, the composite component is in the second state. For instance, after performing the first thermal process at (304), the first vessel may be removed from the chamber of the thermal system. Thereafter, the composite component, now in the second state, may be removed from the first vessel and placed into a second vessel. In some implementations, the second vessel is the first vessel. In other implementations, the second vessel is different than the first vessel but similarly shaped and configured. For instance, as best shown in FIG. 11, the first and second vessels 121, 122 are different but similarly shaped and configured. In such implementations, moving the composite component from the first vessel to a different but similarly shaped second vessel may prevent cross-contamination between thermal processes, such as e.g., between a compaction process and a burnout process.

In some implementations, after the composite component, now in a second state, is placed into the second vessel (which may be the same or different vessel as the first vessel), a control system may control a mover device, such as the mover device 160 described herein, to place the second vessel into the chamber of the thermal system.

Moreover, in some implementations, the second state is one of a green state and a burnt-out state. Stated differently, at (306), the composite component may be a green-state part or a burnt-out part.

At (308), the method (300) includes performing, by the thermal system, a second thermal process to transition the composite component from the second state to a third state. In some implementations, the second thermal process is one of a burnout process, a melt-infiltration process, a polymer impregnation and pyrolyzing process, and a chemical vapor infiltration process. For example, if the second state of the composite component is a green state, then the second thermal process may be a burnout process so that the green-state part may be burnt out, e.g., in a manner as described herein. In such implementations, the second thermal process, or burnout process, may transition the composite component from the second state (i.e., a green state) to a third state (i.e., a burnt-out state). As another example, if the second state of the composite component is a burnt-out state, then the second thermal process may be a melt-infiltration process so that the burnt-out part may be densified or melt-infiltrated, e.g., in a manner as described herein. In such implementations, the second thermal process, or melt-infiltration process, may transition the composite component from the second state (i.e., a burnt-out state) to a third state (i.e., a densified state). In other implementations, the second thermal process may be a polymer impregnation and pyrolyzing process or a chemical vapor infiltration process.

Thereafter, the composite component in the densified state may be finish machined as necessary as described above to form the final composite component. The final composite component may be a CMC component, as noted previously. The control system may activate the thermal system to automatically perform the second thermal process, e.g., after the second vessel is placed within the chamber and the port connections are made, or the thermal system may be activated manually to start the second thermal process. For instance, an operator may commence the operation by selecting the desired thermal process and pushing a start button.

At (310), in some implementations, particularly where the second thermal process is a burnout process and where the third state of the composite component is a burnt-out state, the method (300) includes placing a third vessel having the composite component disposed therein into the chamber of the thermal system, wherein during placing the third vessel, the composite component is in the third state. For instance, after performing the second thermal process at (308), the second vessel may be removed from the chamber of the thermal system. Thereafter, the composite component, now in the third state, may be removed from the second vessel and placed into a third vessel. In some implementations, the third vessel is the second vessel and/or the first vessel. In other implementations, the third vessel is different than the second and first vessels but similarly shaped and configured. For instance, as best shown in FIG. 11, the first, second, and third vessels 121, 122, 123 are different but similarly shaped and configured. In such implementations, moving the composite component from the second vessel to a different but similarly shaped third vessel may prevent cross-contamination between thermal processes, such as e.g., between a burnout process and a melt-infiltration process.

In some implementations, after the composite component, now in a third state, is placed into the third vessel (which may be the same or different vessel as the first and/or second vessels), a control system may control a mover device, such as the mover device 160 described herein, to place the third vessel into the chamber of the thermal system. Moreover, in some implementations, the third state is a burnt-out state. Stated differently, at (306), the composite component may be a burnt-out part.

At (312), in some implementations, the method (300) includes performing, by the thermal system, a third thermal process to transition the composite component from the third state to the fourth state. In some implementations, the third thermal process is a melt-infiltration process. In such implementations, the third state of the composite component is a burnt-out state and the fourth state is a densified state. The burnt-out state composite component may be melt-infiltrated during the third thermal process, e.g., in a manner described herein. In other implementations, the third thermal process may be a polymer impregnation and pyrolyzing process or a chemical vapor infiltration process. Thereafter, the composite component in the densified state may be finish machined as necessary as described above to form the final composite component. The final composite component may be a CMC component (e.g., a SiC—SiC component) or another suitable composite component. The control system may activate the thermal system to automatically perform the second thermal process, e.g., after the second vessel is placed within the chamber and the port connections are made, or the thermal system may be activated manually to start the second thermal process. For instance, an operator may commence the operation by selecting the desired thermal process and pushing a start button.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for manufacturing a composite component, the method comprising:
    placing a first vessel having a preform disposed therein into a chamber defined by a thermal system;
    compacting, by the thermal system, the preform within the first vessel at an elevated temperature and an elevated pressure to transition the preform to a green-state part;
    removing the green-state part from the first vessel;
    placing a second vessel having the green-state part disposed therein into the chamber of the thermal system;
    burning out, by the thermal system, the green-state part within the second vessel at an elevated temperature and under vacuum to transition the green-state part to a burnt-out part;
    removing the burnt-out part from the second vessel;
    placing a third vessel having the burnt-out part disposed therein into the chamber of the thermal system; and
    densifying, by the thermal system, the burnt-out part within the third vessel at an elevated temperature and under vacuum to transition the burnt-out part to the composite component.

2. The method of claim 1, wherein the composite component is a ceramic matrix composite (CMC) component.

3. The method of claim 1, wherein the first vessel and the second vessel are the same vessel.

4. The method of claim 1, wherein the second vessel and the third vessel are the same vessel.

5. The method of claim 1, wherein the first vessel, the second vessel, and the third vessel are different but similarly shaped and configured vessels.

6. The method of claim 1, further comprising:
bagging the preform within a bag under vacuum to form a bagged preform, and wherein during compacting, the preform is the bagged preform, and wherein after compacting, the bag is removed from the green-state part.

7. The method of claim 1, wherein prior to compacting, the method further comprises:
connecting a pressurized fluid source in fluid communication with a volume defined by the first vessel, wherein during compacting, the volume of the first vessel is sealed and fluid from the pressurized fluid source is provided to the volume to pressurize the volume at the elevated pressure.

8. The method of claim 1, wherein the preform is one of a plurality of preforms, and wherein the method further comprises:
positioning the plurality of preforms onto one or more shelves of a rack; and
inserting the rack into a volume defined by the first vessel, and wherein during removing the green-state part from the first vessel comprises removing the rack from the volume of the first vessel.

9. The method of claim 1, wherein densifying, by the thermal system, the burnt-out part within the third vessel at the elevated temperature and under vacuum to transition the burnt-out part to the composite component comprises melt-infiltrating, impregnating and pyrolyzing, or chemical vapor infiltrating.

10. A method for manufacturing a component, the method comprising:
placing a first vessel having the component disposed therein into a chamber defined by a thermal system, wherein during placing the first vessel, the component is in a first state;
performing, by the thermal system, a first thermal process to transition the component from the first state to a second state;
placing a second vessel having the component disposed therein into the chamber of the thermal system, wherein during placing the second vessel, the component is in the second state;
performing, by the thermal system, a second thermal process to transition the component from the second state to a third state;
removing the component in the third state from the second vessel to a third vessel;
placing the third vessel having the component disposed therein into the chamber of the thermal system, wherein during placing the third vessel, the component is in the third state; and
performing, by the thermal system, a third thermal process to transition the component from the third state to a fourth state.

11. The method of claim 10, wherein the first vessel and the second vessel are the same.

12. The method of claim 10, wherein the first thermal process is one of a compaction process and a burnout process, and wherein the second thermal process is one of the burnout process, a melt-infiltration process, a polymer impregnation and pyrolyzing process, and a chemical vapor infiltration process.

13. The method of claim 10, wherein the first state is one of a preform state and a green state, and wherein the second state is one of the green state and a burnt-out state.

14. The method of claim 10, wherein a mover device places the first vessel having the component disposed therein into the chamber defined by the thermal system and wherein the mover device places the second vessel having the component disposed therein into the chamber of the thermal system, and wherein the method further comprises:
removing, by the mover device, the first vessel from the chamber after performing the first thermal process; and
removing, by the mover device, the second vessel from the chamber after performing the second thermal process.

* * * * *